(12) United States Patent
Rivera et al.

(10) Patent No.: US 11,922,468 B2
(45) Date of Patent: Mar. 5, 2024

(54) CROWDFUNDING USING IPTV SYSTEMS AND FUNDRAISING METHODS

(71) Applicants: Manolo Fabio Rivera, Hicksville, NY (US); Prem Makeig, Brooklyn, NY (US)

(72) Inventors: Manolo Fabio Rivera, Hicksville, NY (US); Prem Makeig, Brooklyn, NY (US)

( * ) Notice: Subject to any disclaimer, the term of this patent is extended or adjusted under 35 U.S.C. 154(b) by 224 days.

(21) Appl. No.: 17/528,416

(22) Filed: Nov. 17, 2021

(65) Prior Publication Data

US 2022/0076300 A1 Mar. 10, 2022

Related U.S. Application Data

(63) Continuation of application No. 15/394,848, filed on Dec. 30, 2016, now Pat. No. 11,205,204.

(60) Provisional application No. 62/274,141, filed on Dec. 31, 2015.

(51) Int. Cl.
*G06Q 30/0279* (2023.01)
*G06Q 50/00* (2012.01)
*H04N 21/2743* (2011.01)
*H04N 21/472* (2011.01)
*H04N 21/478* (2011.01)
*H04N 21/61* (2011.01)
*H04N 21/81* (2011.01)

(52) U.S. Cl.
CPC ......... *G06Q 30/0279* (2013.01); *G06Q 50/01* (2013.01); *H04N 21/2743* (2013.01); *H04N 21/47202* (2013.01); *H04N 21/47815* (2013.01); *H04N 21/6125* (2013.01); *H04N 21/812* (2013.01)

(58) Field of Classification Search
CPC .............. G06Q 30/0279; G06Q 50/01; H04N 21/2743; H04N 21/47202; H04N 21/6125; H04N 21/812
See application file for complete search history.

(56) References Cited

U.S. PATENT DOCUMENTS 10,078,917 B1 * 9/2018 Gaeta .................. G06F 3/04815
2006/0122874 A1 * 6/2006 Postrel .............. G06Q 30/0601
705/26.1

(Continued)

OTHER PUBLICATIONS

Robertson, Mark R., "How to Create Annotations with Questions, Quizzes, Surveys, and Polls," [online], published on Sep. 25, 2012, available at: < https://tubularinsights.com/youtube-questions-editor/ > (Year: 2012).*

*Primary Examiner* — Richard W. Crandall
(74) *Attorney, Agent, or Firm* — Jie Tan; JT Law Services, PC

(57) ABSTRACT

The present invention presents a method and device for IPTV crowdfunding or IPTV 5 fundraising. The invented system allows for backers to fund campaigns using commissions paid out from services and products purchased using the system. It is also possible for backers to fund campaigns by volunteering to receive marketing materials or participating in marking presentations, or engaging in other marketing activities, marketing activities that generate a commission, referral fee, or reward, are incorporated into our fundraising system, in order to allow for the funding of campaigns.

20 Claims, 40 Drawing Sheets

(56) References Cited

U.S. PATENT DOCUMENTS

| | | | | |
|---|---|---|---|---|
| 2009/0217321 A1* | 8/2009 | White | .................. | H04N 21/254 |
| | | | | 725/37 |
| 2012/0054020 A1* | 3/2012 | Jacobs | ............... | G06Q 30/0269 |
| | | | | 705/14.42 |
| 2016/0027209 A1* | 1/2016 | Demirli | ................ | G06T 19/003 |
| | | | | 345/419 |
| 2017/0251261 A1* | 8/2017 | James | ................ | H04N 21/2347 |

* cited by examiner

CROWDFUNDING USING IPTV SYSTEMS AND FUNDRAISING METHODS

CROSS-REFERENCE TO RELATED APPLICATION

This application is a continuation of the U.S. patent application Ser. No. 15/394,848 filed on Dec. 30, 2016, which claims the benefit of U.S. Provisional Patent Application No. 62/274,141, filed Dec. 31, 2015, the entire contents of which is hereby incorporated herein by reference for all purposes as if fully set forth herein, under 35 U.S.C. 119(e).

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND

Unless otherwise indicated herein, the materials described in this section are not prior art to the claims in this application and are not admitted to be prior art by inclusion in this section.

1. FIELD OF THE INVENTION

The present invention relates generally to Internet Protocol Television (IPTV). More specifically, the present invention is a method and apparatus for IPTV crowdfunding or IPTV fundraising.

2. DESCRIPTION OF RELATED ART

IPTV refers to the delivery of television content using signals based on the logical Internet Protocol (IP), rather than through traditional terrestrial, satellite signal, and cable television formats. Thus, IPTV television is distributed over an IP network, which is the same kind of network used to surf the internet and exchange emails. Using IPTV technology, it is easy to distribute terrestrial and satellite television and radio, videos, Digital Versatile Disc (DVDs), digital Video-On-Demand (VOD), digital signage, information boards, and web content to a facility or home. All of this multimedia content can be viewed on standard and high-definition televisions as well as personal computers.

A major benefit of IPTV and Internet television is Over-The-Top (OTT) content, which is the delivery of audio, video, and other media over the Internet without the involvement of a multiple-system operator in the control or distribution of the content. OTT is delivered through the open, unmanaged Internet, with the "last-mile" telecom company acting only as the Internet service provider. Both IPTV and OTT use the Internet protocol suite over a packet-switched network to transmit data, but IPTV operates in a closed system, which is a dedicated, managed network controlled by the local cable, satellite, telephone, or fiber company.

The public Internet is used for transmission from the streaming servers to the consumer. A receiver, which must have an Internet connection (typically by Wi-Fi or Ethernet) could be a web browser running on a personal computer, which is typically controlled by a computer mouse and keyboard, or mobile device, such as Firefox, Google Chrome, or Internet Explorer. A receiver may also be a mobile app running on a smartphone or tablet computer or a dedicated digital media player, which typically has a remote control. Such players can take the form of a small box, or even a stick that plugs directly into an HDMI port. Examples include Roku, Amazon Fire, Apple TV, Google TV, Boxee, and WD TV. Sometimes these boxes allow the streaming of content from the local network or storage drive, which typically provides an indirect connection between a television and computer or USB stick. One example includes SmartTV, which has Internet capability and built-in software accessed with the remote control. Another example includes a DVD player or Blu-ray player with Internet capabilities in addition to its primary function of playing content from physical discs. Still another example includes a set-top box or digital video recorder provided by the cable or satellite company. A further example includes an independent party like TiVo, which has Internet capabilities in addition to its primary function of receiving and recording programming from the non-Internet cable or satellite connection. Display devices include a television set or video projector linked to the receiver with a video connector, such as a HDMI, a computer monitor, and the built-in display of a smartphone or tablet.

Not all receivers can access all content providers. Most have web sites that allow for the viewing of content in a web browser, but sometimes this is not done due to digital rights management concerns. While a web browser has access to any web site, some consumers find it inconvenient to control their viewing with a mouse and keyboard, and inconvenient or confusing to connect a computer to their television. Many providers have mobile apps dedicated to receiving only their own content. Manufacturers of SmartTVs, boxes, sticks, and players must decide which providers to support, which is typically based on popularity, common corporate ownership, or the receipt of payment from the provider.

Content providers that are rushing to create direct-to-consumer Subscription-Video-On-Demand (SVOD) offerings, are finding that repackaging television content may not be enough to make the services successful. Multicast Broadcast Single Frequency Network (MBSFN) is a communication channel defined in the 4G cellular networking standard called Long Term Evolution (LTE). The transmission mode is intended as a further improvement in the efficiency of the enhanced Multimedia Broadcast Multicast Service (eMBMS) service, which can deliver services such as mobile television using the LTE infrastructure, and is expected to compete with dedicated mobile and handheld television broadcast systems such as Digital Video Broadcasting—Handheld (DVB-H) and Digital Video Broadcasting—Satellite services to Handhelds (DVB-SH). This enables network operators to offer mobile television without the need for an additional expensive licensed spectrum and without requiring new infrastructure and end-user devices. The MBSFN transmission mode further improves the spectral efficiency, since it is based on the principles of Dynamic Single Frequency Networks (DSFN). This implies that it dynamically forms Single Frequency Networks (SFNs), which are groups of adjacent base stations that send the same signal simultaneously on the same frequency sub-carriers, when there are mobile television viewers of the same television program content in the adjacent cells.

Many people who create campaigns need financial supporters. Although many people want to support these creators, it is not easy for these potential supporters to do so. This is because there is currently no website, app, or IPTV broadcasting network that allows for funding campaigns to be created, where supporters can effectively direct funds to the creator of the campaign using a method other than direct payment. Additionally, there are no systems that operate using IPTV networks, which would enable the streaming of high resolution videos, including, but not limited to the 4K standard. The term "4K resolution" refers to a horizontal resolution of approximately 4,000 pixels. The use of "width" to characterize the overall resolution marks a switch from previous television standards such as 480i and 1080p, which categorize media according to its vertical dimension. Using that same convention, 4K UHD would be called 2160p.

Digital Cinema Initiatives, LLC (DCI) is a joint venture of major motion picture studios, formed to establish a standard architecture for digital cinema systems. There are two main 4K resolution standards. The first is the DCI 4K resolution standard, which has a resolution of 4096×2160 pixels (256:135, approximately a 1.9:1 aspect ratio). This standard is widely respected by the film and video production industry. The DCI 4K standard has twice the horizontal and vertical resolution of DCI 2K. The second is the 4K Ultra High Definition Television (UHDTV) or "UHD-1" standard, which has a resolution of 3840×2160 (16:9, or approximately a 1.78:1 aspect ratio). This standard is mostly used in consumer television and media. This standard has twice the horizontal and vertical resolution of 1080p. Manufacturers may advertise their products as UHD 4K, or simply 4K, when the term 4K is traditionally reserved for the cinematic, DCI resolution. This often causes confusion among consumers.

Accordingly, there is a need for a device or a method where a website, app, or IPTV broadcasting network allows for funding campaigns to be created in which users can effectively direct funds to the creator of the campaign using a method other than direct payment. Additionally, there is a need for a method that operates using Internet Protocol Television, or IPTV networks, which would enable the streaming of high resolution videos.

BRIEF SUMMARY OF THE INVENTION

It is a principal object to solve at least one of the disadvantages with other attempted solutions or to create other utility by providing a device or a method where a website, app, or IPTV broadcasting network allows for funding campaigns to be created in which users can either effectively direct funds to the creator of the campaign using a method other than direct payment, where the method operates using either Internet Protocol Television, IPTV networks, streaming high resolution videos, or a similar method.

The present disclosure is an invention that is a system including an IPTV broadcasting network and mobile application that allows for users of the system to do fundraising and to fund campaigns using alternative methods other than direct payment, as well as to allow for the funding of campaigns to happen at the point of sale using point of sale terminals. Current methods for fundraising online today, allows for users to create fundraising campaigns and other users to support the campaigns. The users who create such campaigns are typically referred to as "creators," while the users who support such campaigns financially are typically referred to as "backers." Campaigns typically have a specific funding period and a financial goal which the campaign is trying to reach. The money that is pledged from backers is sometimes only distributed to the campaigns if the goal of the campaign is reached before the funding period of the campaign ends. The system is open to anyone to back campaigns and to creators from the United States and several other countries. For the purposes of this disclosure, "users" are IPTV viewers or mobile application users.

The proposed solution improves upon traditional online fundraising systems by allowing backers to fund campaigns by viewing an IPTV broadcasting network and by using other methods other than direct money transfer. It is also possible to fund campaigns at the point of sale in, for example, retail stores. The system allows for backers to fund campaigns using commissions or rewards received by purchasing products and services. It is also possible for backers to fund campaigns by volunteering to receive marketing materials or participating in marking presentations, or engaging in other marketing activities. It would also be possible for a backer to help fund a campaign by distributing marketing messages on social media platforms or getting other people to purchase a product or service they recommend. Any type of marketing activities which can generate a commission, referral fee, or reward could be incorporated into our fundraising system, in order to allow for the funding of campaigns.

BRIEF DESCRIPTION OF THE DRAWINGS

The accompanying drawings, which are incorporated in and constitute a part of this specification, illustrate several aspects described below.

DETAILED DESCRIPTION

Figure 1:
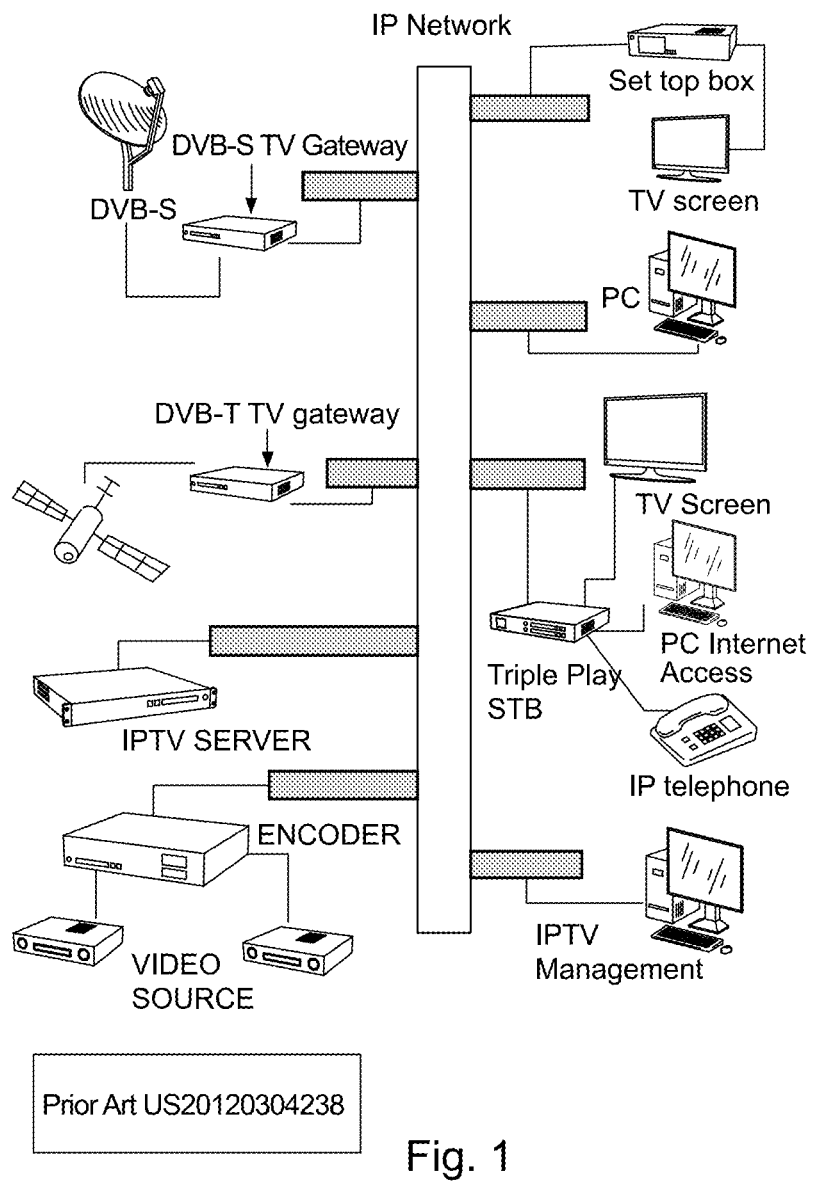
FIG. 1 shows a prior art architecture example of an end-to-end IPTV system.

It is to be understood that this invention is not limited to any particular embodiment described, which may vary. Also, it is to be understood that the terminology used herein is for the purpose of describing particular embodiments only, and is not intended to be limiting, since the scope of this invention will be limited only by the appended claims.

In the following detailed description, numerous specific details are set forth in order to explain and provide a thorough understanding of the present invention. However, it is apparent that the present invention may be practiced without all of these specific details. Thus, all illustrations of the drawings are for the purpose of describing versions of the present invention, and are not intended to limit the scope of the invention In the following section, the present invention is described fully by referencing the details in the enclosed drawings, which illustrate certain embodiments of the invention. The numbers shown in this specification refer to the corresponding numbers in the enclosed drawings. The terminology used is to describe the particular embodiment shown and is not intended to limit the scope of the invention. The invention may also be embodied in many other forms in addition to the embodiments shown. Thus, the embodiments shown should not be construed as limiting, but rather, to allow a thorough and complete description of the disclosure that conveys the scope of the invention to a person having ordinary skill in the art in the field of this invention. Therefore, for the terms used herein, the singular forms "the," "a," and "an" are intended to include the plural forms as well as the singular forms, unless the context clearly indicates otherwise. The term "and" includes any and all combinations of one or more of the associated listed items. As used herein, the terms "comprising" and "comprises" when used in this specification, identify specific steps, integers, operations, features, components, and elements, but do not preclude the presence or addition of one or more other steps, operations, features, components, and elements. In addition, the features, components, and elements referenced may be exaggerated for clarity.

Unless otherwise defined, all scientific terms, technical terms, or other terms used herein have the same meaning as the term that is understood by one having ordinary skill in the art in the field of this invention. It is also understood that these terms, including their dictionary meaning, should be understood as having the meaning, which is consistent with their definitions in the related relevant art. In addition, the present disclosure is not to be interpreted in an idealized or overly formal sense unless expressly stated so herein. Constructions or functions that are well known in the art may not be fully described in detail for brevity.

In describing the invention, it is understood that a number of steps and methods may be disclosed. Each of these may have individual benefit. Also, each may be used in conjunction with at least one or more of the disclosed steps and methods. Therefore, this description will refrain from stating each and every possible combination of the individual steps and methods for the sake of brevity. Regardless, the specification and related claims should be understood with the combinations that are entirely within the scope of the claims and inventions.

The disclosure in this invention are examples of how it may be implemented and are not intended to limit the scope of the invention to the specific embodiments shown in the accompanying drawings or the description provided herein. The present invention will now be described by example in the following paragraphs by referencing the accompanying drawings, which represent embodiments and alternative embodiments.

All illustrations are for the purpose of describing selected versions of the present invention and are not intended to limit the scope of the present invention.

FIG. 1 shows a prior art architecture example of an end-to-end IPTV system. The end-to-end IPTV system consists of head-end equipment and user-end equipment coupled via a broadband IP network to receive appropriate audio/video and general IP traffic data. The head-end equipment includes a streaming server, a video server, and a level III device. A level III device is a switch or router that supports multicast transmission. The router or switch resides at the head-end, interfacing with the network. Another router or switch receives data at the central office and transmits either to a Digital Subscriber Line Access Multiplexer (DSLAM) located there, or directly to equipment in the user end. A DSLAM is a network device, usually at a telephone company central office, that receives signals from multiple customer Digital Subscriber Line (DSL) connections and puts the signals on a high-speed backbone line using multiplexing techniques. The streaming server encodes and streams live streams in real-time and pre-encoded streams that are stored on the video server. The streaming server transmits the streams to the switch or router which transfers them over the backbone to the central or remote offices, and then to the end user location.

Video servers fulfill several purposes. For store and forward transmissions, video servers store digitally encoded content and stream it through level III devices via operators' networking infrastructure. Video servers receive newly encoded digital content that is uploaded from the streaming server. Video servers also enable time shifted television applications. Viewers at home can then watch any program at a time convenient to them.

The user-end equipment is coupled to the broadband IP network and configured to receive the TV/IP stream. The user end may include an external or internally integrated modem, such as a DSL, cable or satellite modem, or may be a wireless WiMAX, Wi-Fi or the like wireless telecommunications modem. This modem receives the stream from the DSLAM or Level III device and transfers it directly to the user-end equipment, for example a PC for display on the desktop or to the IP Set-Top Box (STB) for display directly on a TV. An IP STB functions as a gateway between the television set/PC and the broadband IP network via a Public Switched Telephone Network (PSTN), satellite or cable link. In this regard, an IP STB provides all the necessary signal processing-receiving, and decoding/decompressing, as well as also accepts commands from the user and transmits these commands back to the network, often through a back channel.

The above described advanced IP STBs are capable of functioning, among other ways, as a television signal receiver, a modem, a game console, a web browser, as well as support e-mail capabilities, video-conferencing, and IP telephony over a broadband network link. In addition, advanced IP STBs may be equipped with additional components and functionality such as with Electronic Program Guide (EPG), CD ROM, DVD player, and the like. IPTV network capable STBs include bandwidth dimensioning as IPTV and VOD services require high bandwidth capacities and predictable performance, placing additional requirements on the network. When designing an STB it is known to take into consideration compression and coding technology transmission rate requirements. The key parts include hardware, a data network interface, a decoder, a memory buffer, and synchronization hardware routines.

Figure 2:
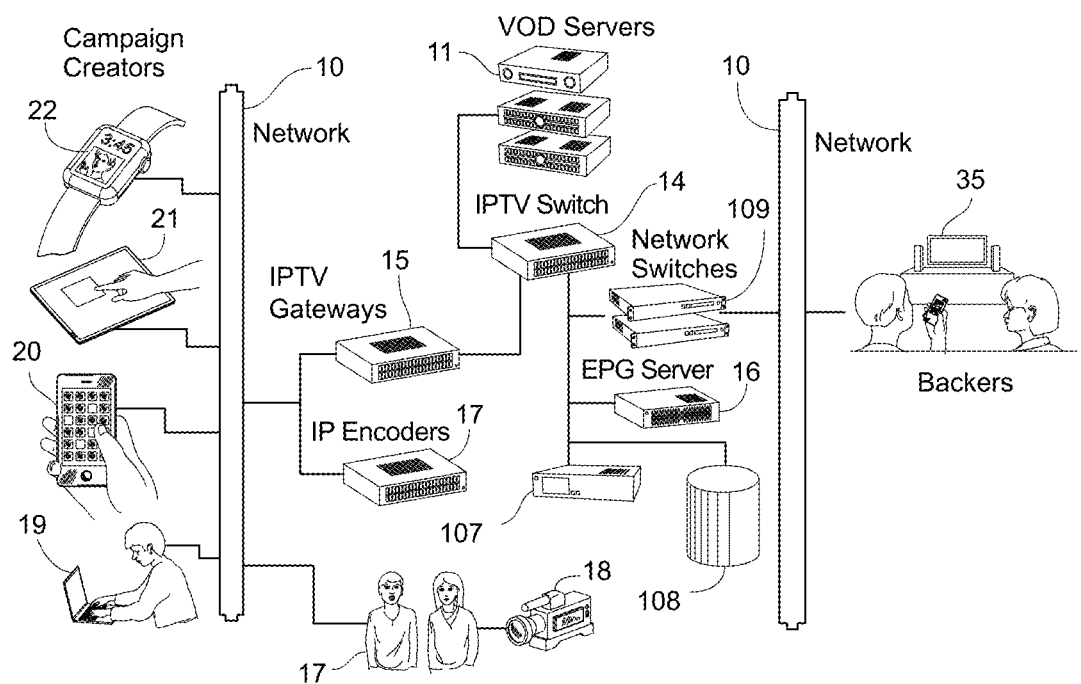
FIG. 2 shows a functional IPTV crowdfunding system enabling the creation of fundraising campaigns in which at least one of the embodiments of this invention is implemented.

FIG. 2 shows a functional IPTV crowdfunding system enabling the creation of fundraising campaigns. A campaign comprises a title, a description, VOD, live streaming video, pictures, text chat, voice chat, and video chat.

A campaign may be created using a number of electronic devices connected to an IP network 10 including personal computers 19, smart phones 20, digital tablets 21, smart watches 22, or media devices comprising cameras 18 and similar devices. These devices may be connected to the IP network 10 to input recorded video content as well as live broadcasting video content. More broadly the IPTV crowdfunding system comprises, IP encoders 17, VOD servers 11, network switches 109, IPTV gateways 15, IPTV switches 14, digital televisions 35, middleware, EPG servers 16, and middleware servers, IPTV management servers, switches, and data storage. The middleware software comprises a graphical user interface, codec manager, conditional access manager, conditional access interface, crowdfunding campaign management interface, media interface, events interface, system settings interface, $3^{rd}$ party system interface, and presentation manager. The IPTV crowdfunding network may operate at various speeds including but not limited to 10, 20, 30, 40, 50, and 200 GBPS.

It is also possible to use the system to support funding campaigns by backing a campaign financially using a device connected to the network. Backers may also view live broadcast video, VOD services, crowdfunding campaign videos and live streaming video content, as well as interact with campaign creators via live video/text/audio chat.

Figure 3:
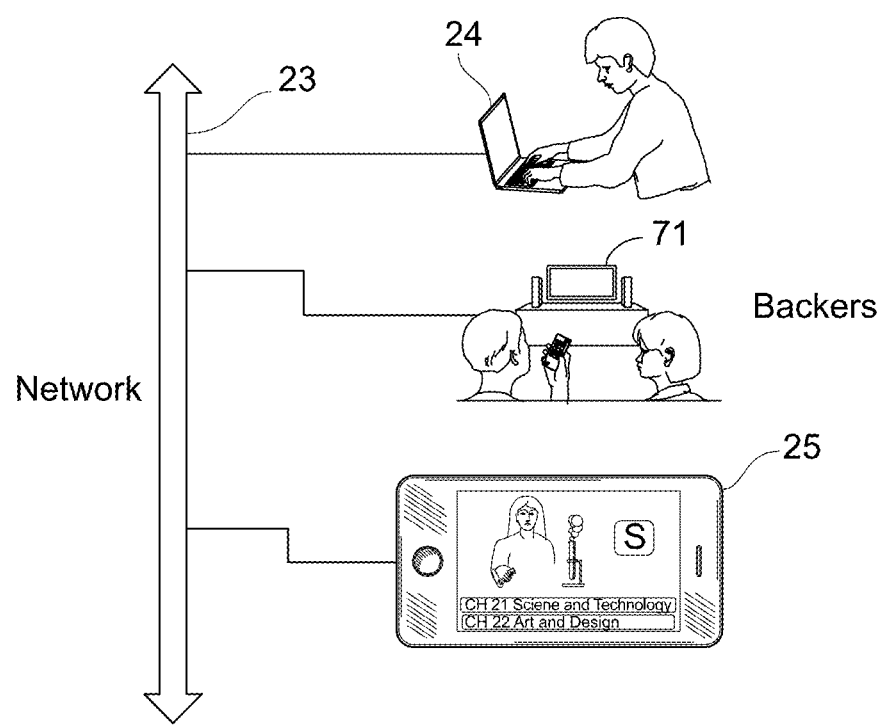
FIG. 3 shows an aspect of the IPTV crowdfunding system, once a campaign has been created by user, allowing for backers to support campaigns in which at least one of the embodiments of this invention is implemented.

FIG. 3 shows an aspect of the IPTV crowdfunding system, once a campaign has been created by user, allowing for backers to support campaigns, comprising: a live television stream, integrated DVR controls, multiple camera and audio feeds, the ability to stream multiple channels or events simultaneously, instant replay of live broadcasts, real-time data and social feeds published live-to-VOD clips, on-the-fly integrated EPG information, the ability to deliver personalized content and experiences on a number of different devices including personal computers 24, mobile computers, laptops, tablets, a television 71, and smartphones 25, connected to a network 23 to support funding campaigns.

Figure 4:
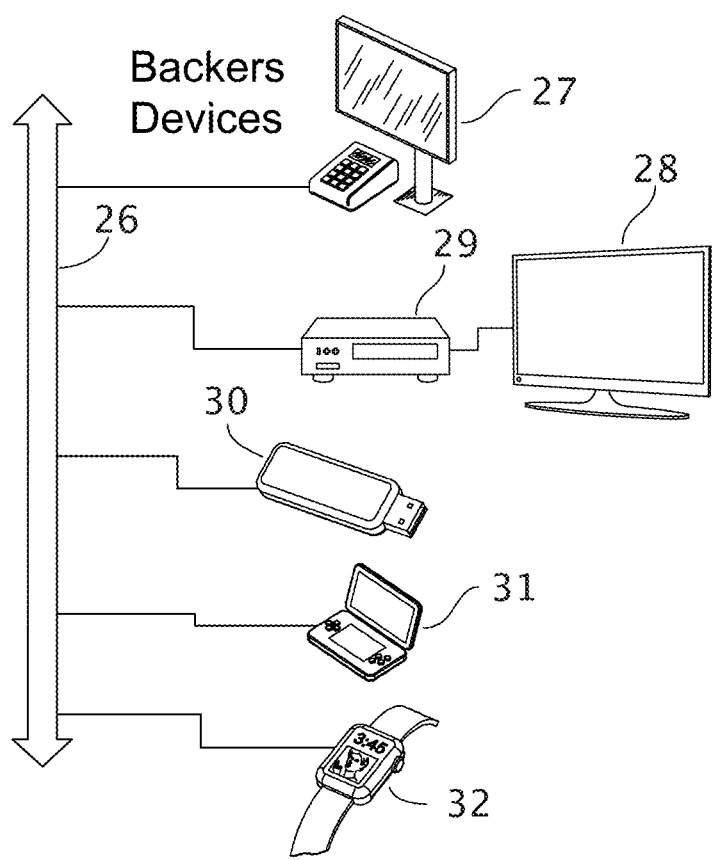
FIG. 4 shows, by means of the IPTV crowdfunding system that funding campaigns can be displayed on a number of different devices in which at least one of the embodiments of this invention is implemented.

FIG. 4 shows by means of the IPTV crowdfunding system that funding campaigns can be displayed on a number of different devices, which are connected to the network 26. These devices include point of sale terminals 27, televisions 28 that are connected to the network 26 via a set-top box 29 or a dongle 30, handheld entertainment and gaming devices 31 including virtual reality and augmented reality headsets, and smartwatches 32.

Figure 5:
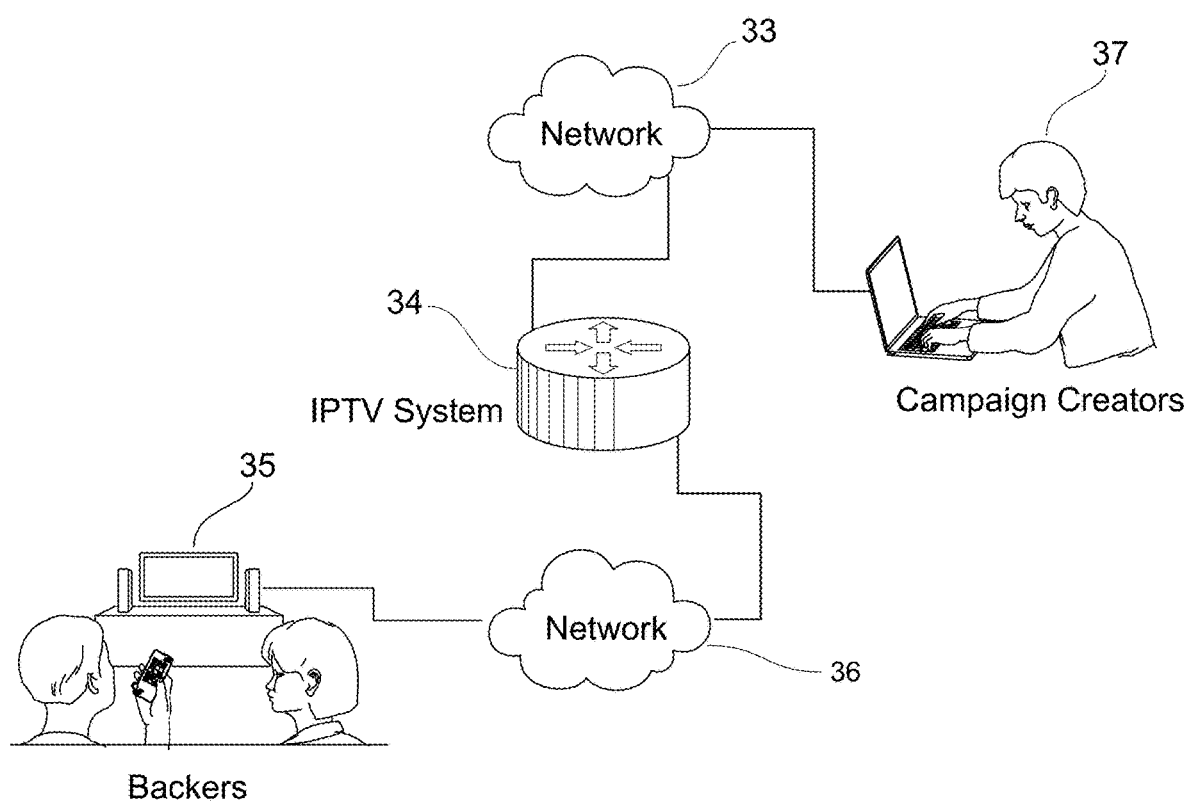
FIG. 5 shows the IPTV crowdfunding system comprising an IPTV server on the network enabling campaign creators to interact with campaign backers, in which at least one of the embodiments of this invention is implemented.

FIG. 5 shows the IPTV crowdfunding system comprising an IPTV server on the network 33 enabling campaign creators 37 to interact with campaign backers 35 through live video chat, Voice-Over-IP (VOIP), and text chat. Campaign creators can input necessary information into the IPTV crowdfunding system 34, via other networks 33, including internet and third-party networks. Campaign viewers and backers can access the IPTV crowdfunding system 34 via other networks 36 including the internet or via private gateway networks.

Figure 6:
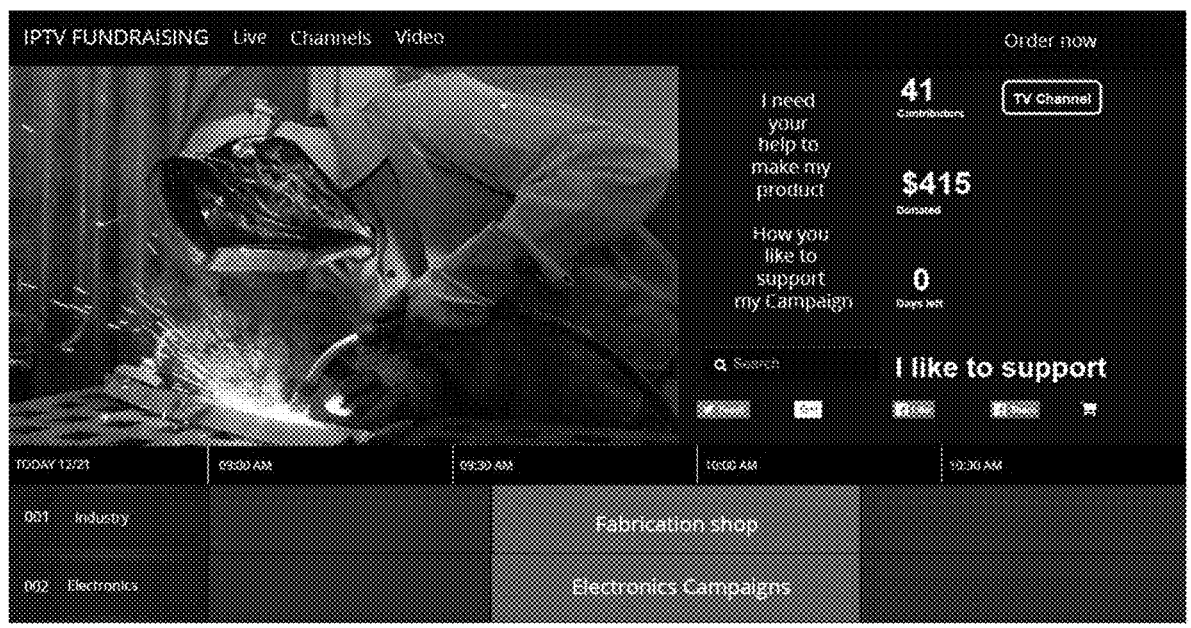
FIG. 6 and FIG. 6A shows IPTV crowdfunding with live-to-VOD clips, on-the-fly integrated EPG information, and a television display receiving information from the middleware program of the IPTV crowdfunding system in which at least one of the embodiments of this invention is implemented.
Figure 6A:
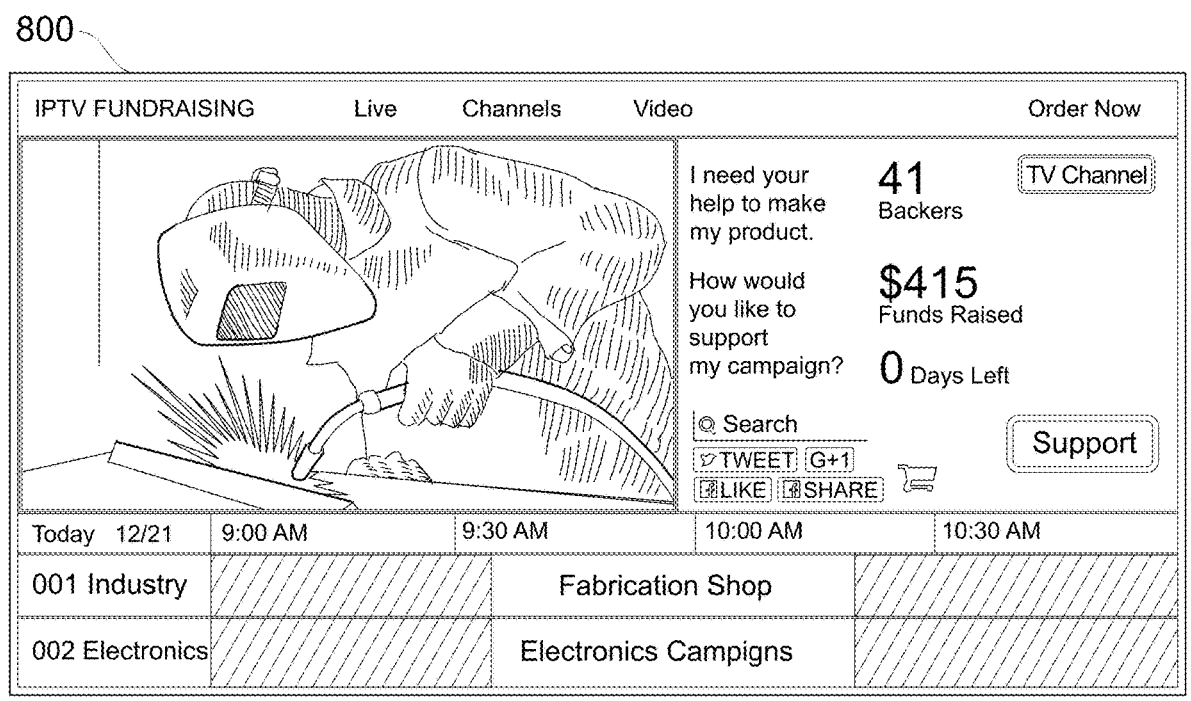

FIG. 6 and FIG. 6A shows IPTV crowdfunding with live-to-VOD clips, on-the-fly integrated EPG information, and a television display receiving information from the middleware program of the IPTV crowdfunding system. As shown on FIG. 6A, on the screen appears an overview of a campaign 800, including a streaming video, the number of people supporting the campaign, the total amount of money raised by the campaign, funding period, and a button to initiate support of the campaign. Note that supporting a campaign is the same thing as backing a campaign. Also, within the screen appears an in-frame view of a programming schedule allowing for navigation to other campaigns.

Figure 7:
FIG. 7 and FIG. 7A shows a campaign overview screen from the IPTV crowdfunding system with live-to-VOD clips, on-the-fly integrated EPG information, a television display, or mobile devices in which at least one of the embodiments of this invention is implemented.
Figure 7A:
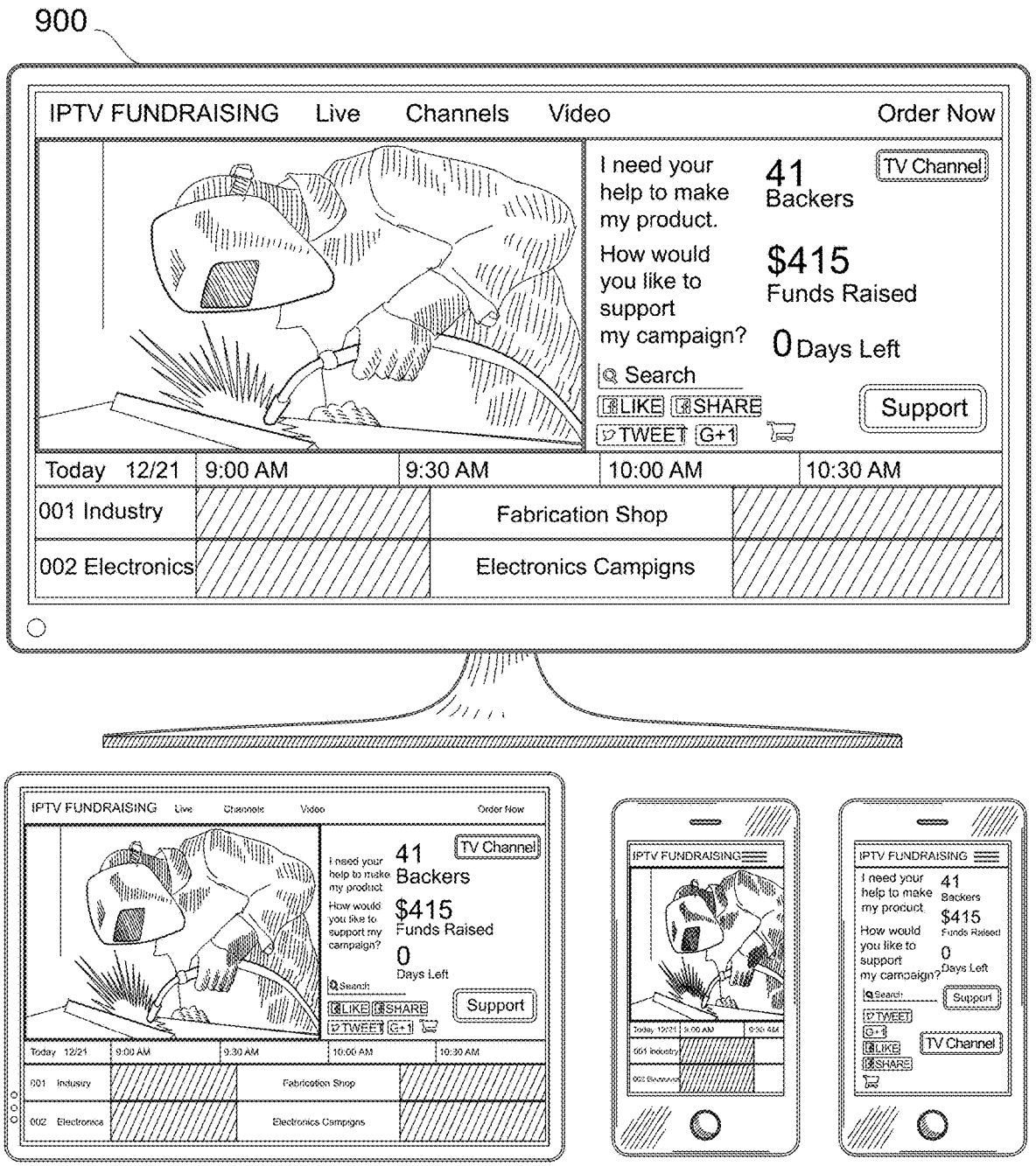

FIG. 7 and FIG. 7A shows a campaign overview screen 900 from the IPTV crowdfunding system with live-to-VOD clips, on-the-fly integrated EPG information, a television display, or mobile devices including a smartphone and digital tablet, receiving information from the middleware program of the IPTV crowdfunding system.

Figure 8:
FIG. 8 and FIG. 8A Shows an IPTV crowdfunding user interface with buttons allowing users to navigate to different campaigns from different categories in which at least one of the embodiments of this invention is implemented.
Figure 8A:
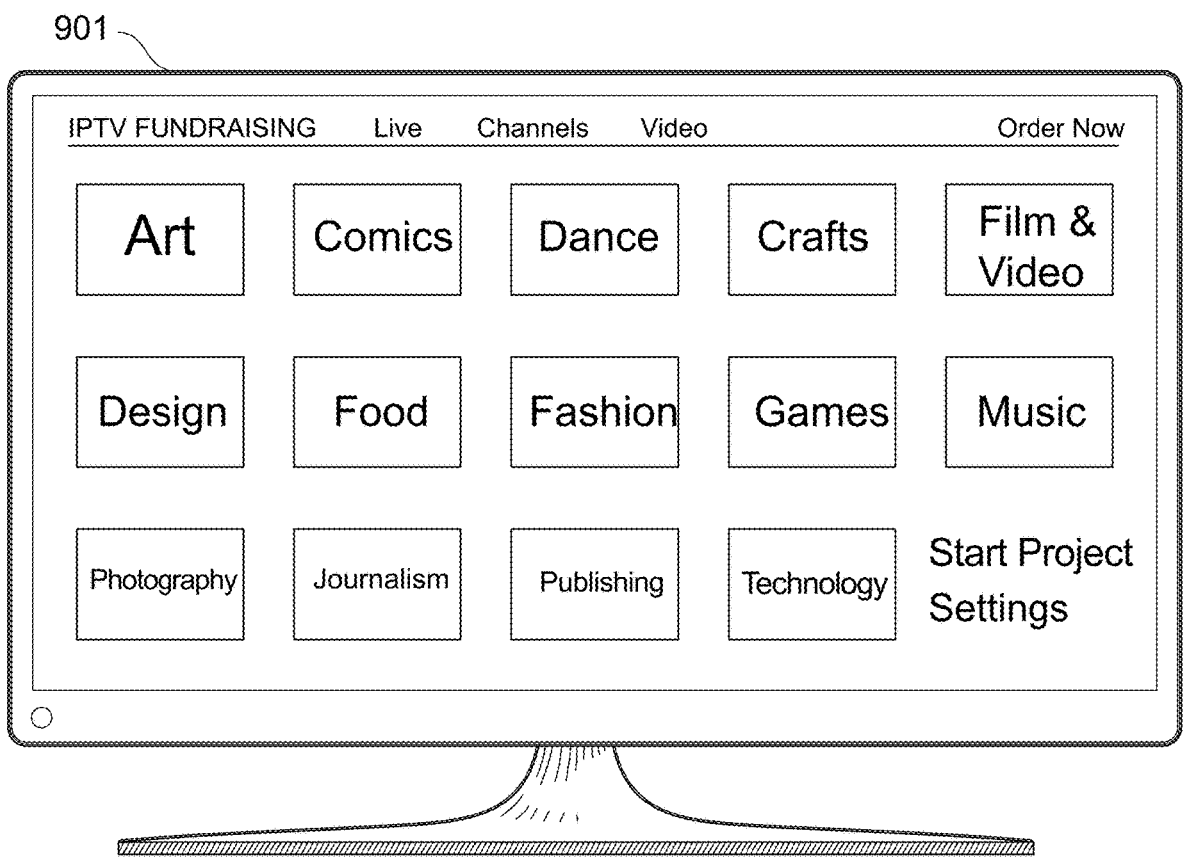

FIG. 8 and FIG. 8A shows an IPTV crowdfunding user interface 901 with buttons allowing users to navigate to different campaigns from different categories. The campaigns in each category can be viewed either individually or linked together into a continuous broadcasting channel.

Figure 9:
FIG. 9 and FIG. 9A shows IPTV crowdfunding programming content with live-to-VOD clips and on-the-fly integrated EPG information in which at least one of the embodiments of this invention is implemented.
Figure 9A:
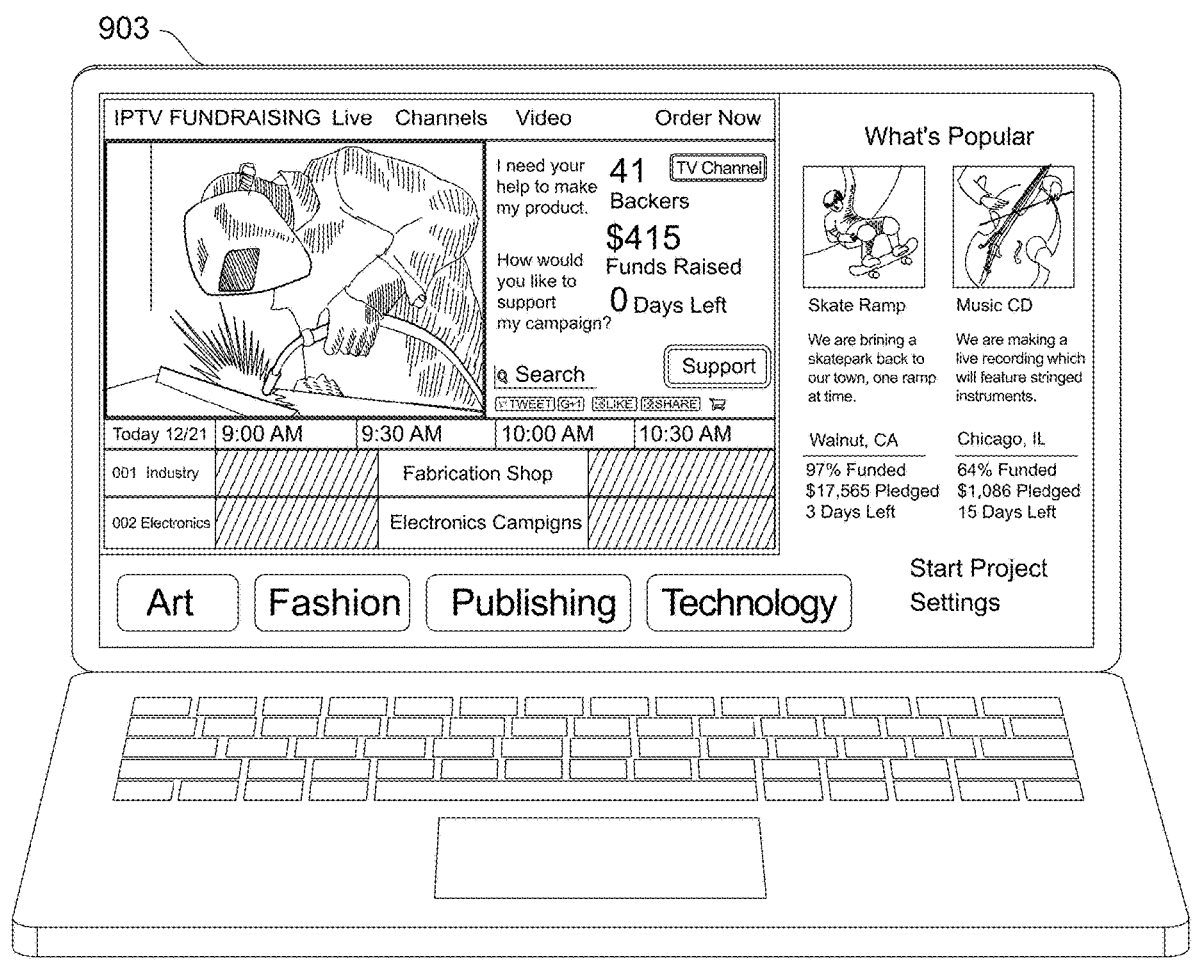

FIG. 9 and FIG. 9A shows IPTV crowdfunding programming content 903 with live-to-VOD clips and on-the-fly Integrated EPG information. The interface shown is for a system comprising: a system settings interface, a streaming video, campaign information including the number of people supporting the campaign, amount of money raised by the campaign, days left in the campaign, two featured campaigns with thumbnail images and campaign descriptions, an in-frame broadcasting schedule, a navigation bar for navigating to other campaigns, a button allowing users to start their own campaign, and a settings button.

Figure 10:
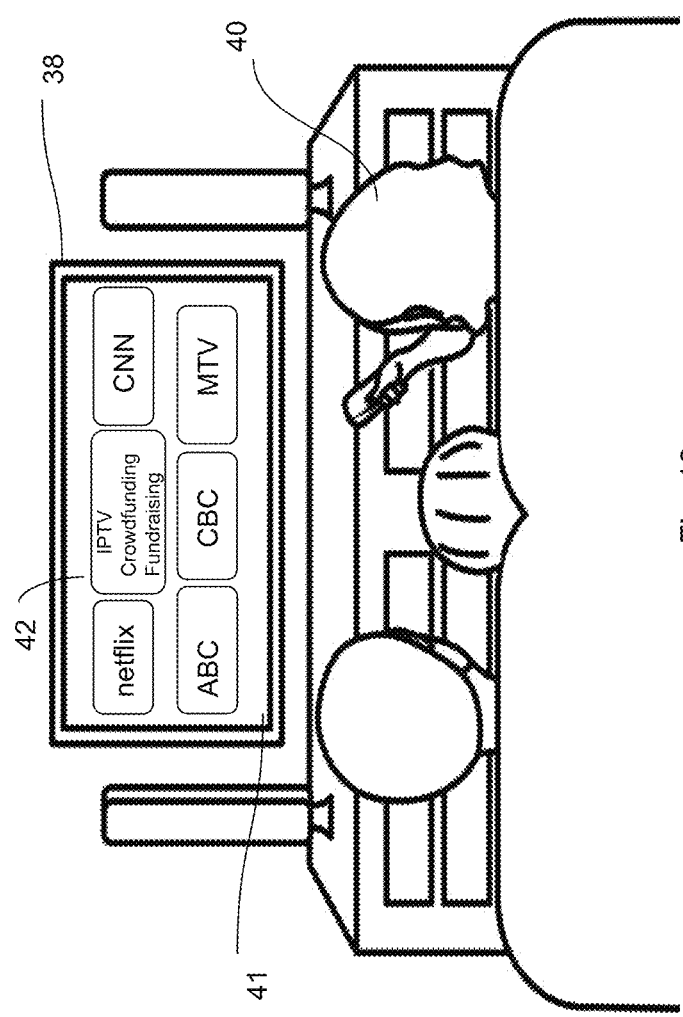
FIG. 10 shows an IPTV crowdfunding system interface on a screen with a number of different app icons that can be selected in which at least one of the embodiments of this invention is implemented.

FIG. 10 shows an IPTV crowdfunding system interface 41 on a screen of a digital television 38 with a number of different app icons that can be selected, such as an IPTV Crowdfunding Fundraising channel button 42, by a person using the IPTV crowdfunding system 40. The system comprises broadcasting networks, a middleware component for broadcasting networks including ABC, CNN, CBC, and MTV, wherein the IPTV crowdfunding system allows for the addition of Internet television, a type of over-the-top content, or peer-to-peer video hosting service such as YouTube, Vimeo, or IPTV crowdfunding. Also, included in the system are the capabilities of a physical smart television or set top box comprising: a web browser, such as Firefox or Google Chrome and $3^{rd}$ party apps, including the ability to operate a cloud desktop, remote desktop, virtual desktop, or Desktop-As-A-Service (DAAS) (typically controlled by computer mouse and keyboard) via browser or app interface.

Figure 11:
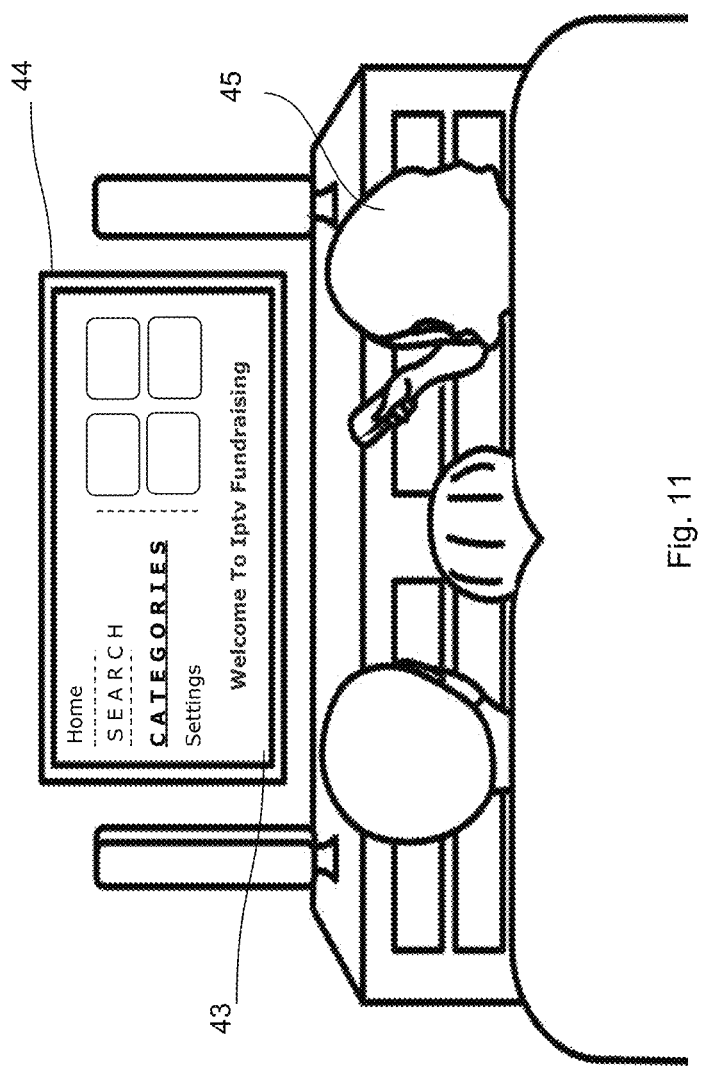
FIG. 11 shows IPTV crowdfunding with a search browser on the screen that may appear after selecting the crowdfunding app icon in which at least one of the embodiments of this invention is implemented.

FIG. 11 shows IPTV crowdfunding on a digital television 44 with a search browser on the screen 43 that may appear after selecting the crowdfunding app icon by a person 45 using the IPTV system. On the screen is included a selection of campaigns, a search button or box, a link to categories of campaigns, and a settings link. It is also possible to start playing a continuous stream of campaign videos.

Figure 12:
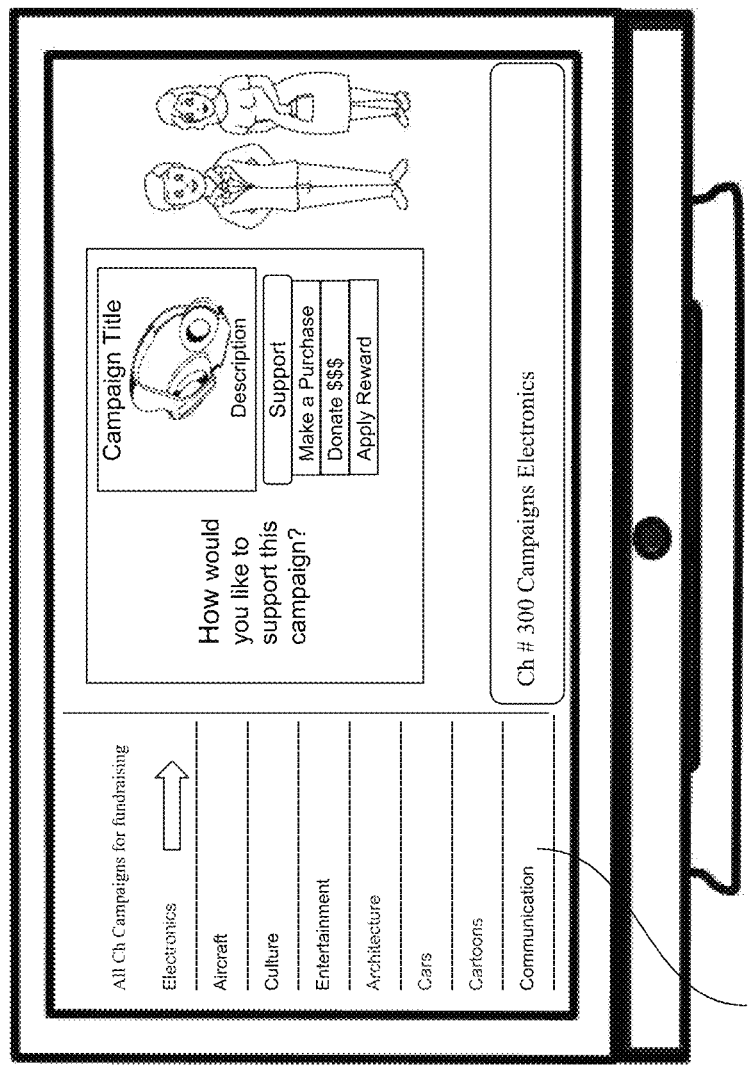
FIG. 12 shows what may be displayed, including multiple campaigns shown in a continuous channel format, after a user selects a funding campaign category on the screen or using the buttons on the screen in FIG. 11, or any other way of navigating to this screen in which at least one of the embodiments of this invention is implemented.

FIG. 12 shows what may be displayed, including multiple campaigns shown in a continuous channel format 46, after a user selects a funding campaign category on the screen or using the buttons on the screen in FIG. 11, or any other way of navigating to this screen. This screen includes a menu for navigating to different campaigns. Once the user has navigated to a campaign on the system, it is possible to watch a video, read the title and description of the campaign, as well as view additional supporting images or videos. Unlike current website-based systems, our system allows for the backing of campaigns while a video is playing. If a user decides to support a campaign, it is possible to click on a support button on the screen while a video is playing. This also allows for the backing of campaigns that include live streaming video. Once the button to back the campaign is pressed, an inset or floating window can appear, allowing for the selection of different methods of supporting a campaign. These methods include purchasing a product or service, donating or pledging money, and applying a reward.

One aspect of the disclosure is a method of live content with an EPG, and an IPTV crowdfunding system configured to perform the method or at least a portion thereof. The method comprises some or all of the following acts:

FIG. 2, FIG. 11, and FIG. 12 show a functional IPTV crowdfunding system enabling the creation of fundraising campaigns. A campaign comprises a title, a description, VOD, live streaming video, pictures, text chat, voice chat, and video chat, live streaming video with live chat. Another aspect of the disclosure is an IPTV crowdfunding system or computer-implemented method.

Figure 13:
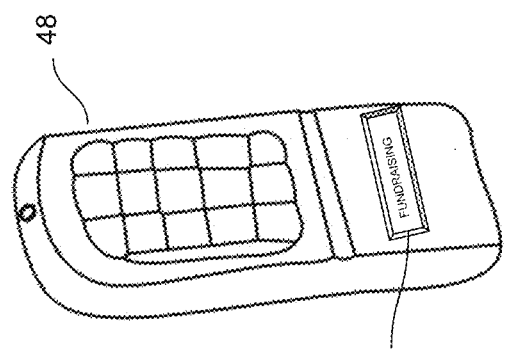
FIG. 13 shows a remote control used for controlling the IPTV crowdfunding system including a digital television in which at least one of the embodiments of this invention is implemented.

FIG. 13 shows a remote control used for controlling the IPTV crowdfunding system including a digital TV. It is possible with this system to include either a physical button 47 or a button on a screen embedded into the remote control 48 to start backing a campaign. This would be similar to selecting a button on the screen of the television to back a campaign, but the process would be made easier, by placing the button on the remote control. It is also possible with our IPTV crowdfunding system to back a campaign with one click. If the user indicates in advance their preferred default backing amount (i.e. $20), and that information is stored on the network, it is possible to allow users to back a project by clicking once on a button on the remote control or its case, or by selecting the one-click support button on the screen of the remote control or on the screen of an electronic device connected to the IPTV network. It is also possible to use a smartphone, tablet, smartwatch, motion controller used with VR or AR system, or any other device with software and hardware allowing the device to function as a remote control with the features described above including one click funding of campaigns. It is also possible to support a campaign with two clicks, for screen interfaces, where the first click indicates an intent to support the campaign and the second click would be on a dropdown, popup, or scroll menu, indicating the funding amount.

Figure 14:
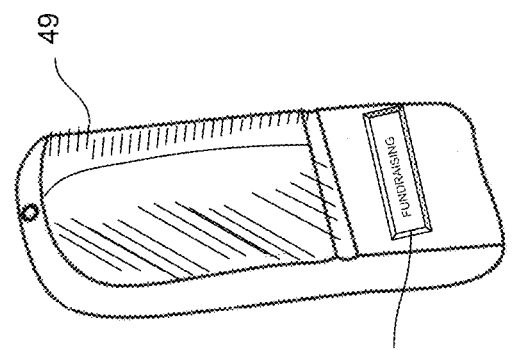
FIG. 14 shows a case for a remote control used for controlling the IPTV system including a digital television in which at least one of the embodiments of this invention is implemented.

FIG. 14 shows a case for a remote control 49 used for controlling the IPTV system including a digital TV. It is possible to include either a physical button 47 or a button on a screen embedded into the case for the remote control to start backing a campaign. This would be similar to selecting a button on the screen of the television to back a campaign, but it would make it easier, by placing the button on the case for the remote control.

Figure 15:
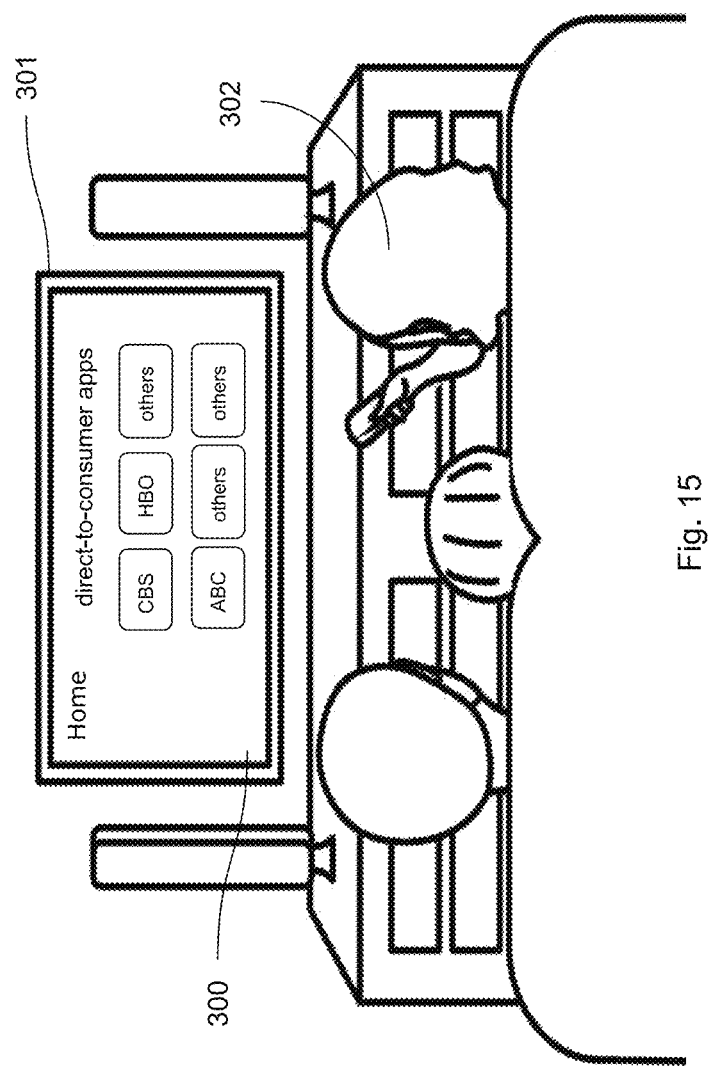
FIG. 15 shows a multiple app interface of the IPTV crowdfunding system that may appear after a user selects the button on FIG. 12 to buy a product or service in order to support the funding campaign of choice in which at least one of the embodiments of this invention is implemented.

FIG. 15 shows a multiple app interface of the IPTV crowdfunding system that may appear on the screen 300 of a digital television 301 after a user 302 selects one of the support buttons on FIG. 12 to buy a product or service, donate, or apply a reward to support the funding campaign of choice. One possible product type is an application or paid media content, including OTT services and VOD offerings, purchased and delivered over the IPTV crowdfunding system. It is also possible to buy digital products from other networks and have them delivered to the user via the IPTV crowdfunding system.

Figure 16:
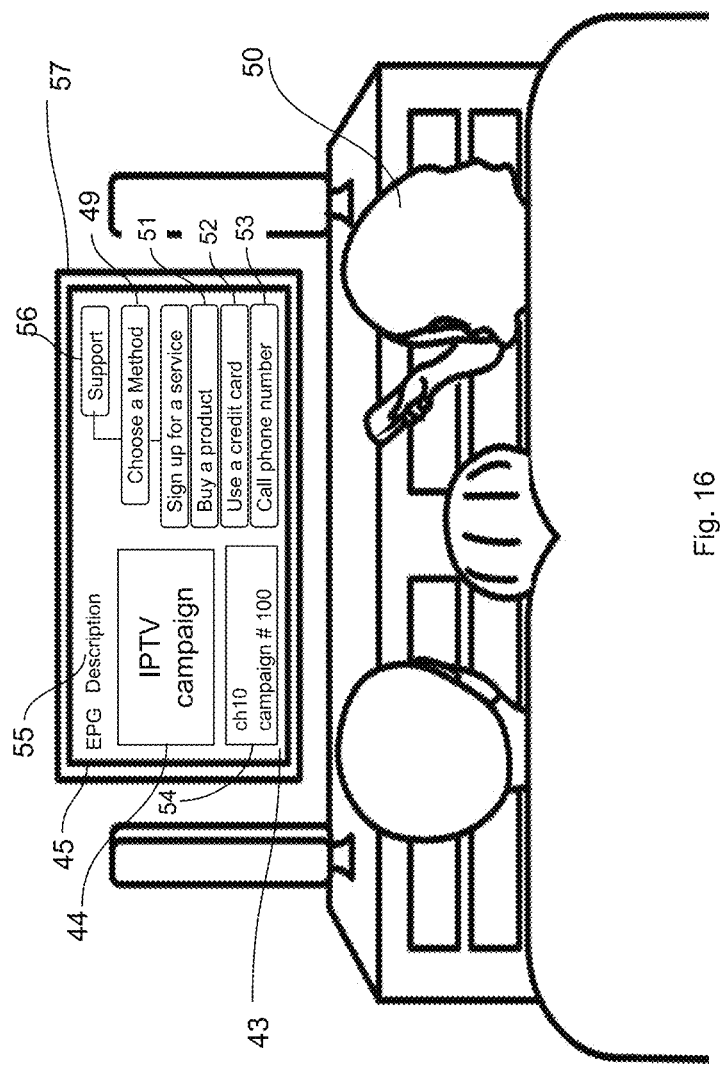
FIG. 16 shows an alternative layout of the IPTV crowdfunding system to the layout of FIG. 12, in which the support methods window is inset into the framing of the video in which at least one of the embodiments of this invention is implemented.

FIG. 16 shows an alternative layout of the IPTV crowdfunding system to the layout shown in FIG. 12, in which the support methods window is inserted into the framing of the video. In addition, two other methods for supporting a campaign are shown. One is to call a phone number 53, and the other is to sign up for a service. FIG. 16 also shows a description of the campaign 55, an EPG 45, a campaign video 44, a campaign title 54, a campaign support screen 43, a support button 56, a support methods menu 49, a person using IPTV crowdfunding system 50, a buy a product button 51, a direct payment button 52, a digital television 57. And a call phone number button 53, where after the call a commission or fee is transferred to the campaign if the backer meets certain conditions.

Figure 17:
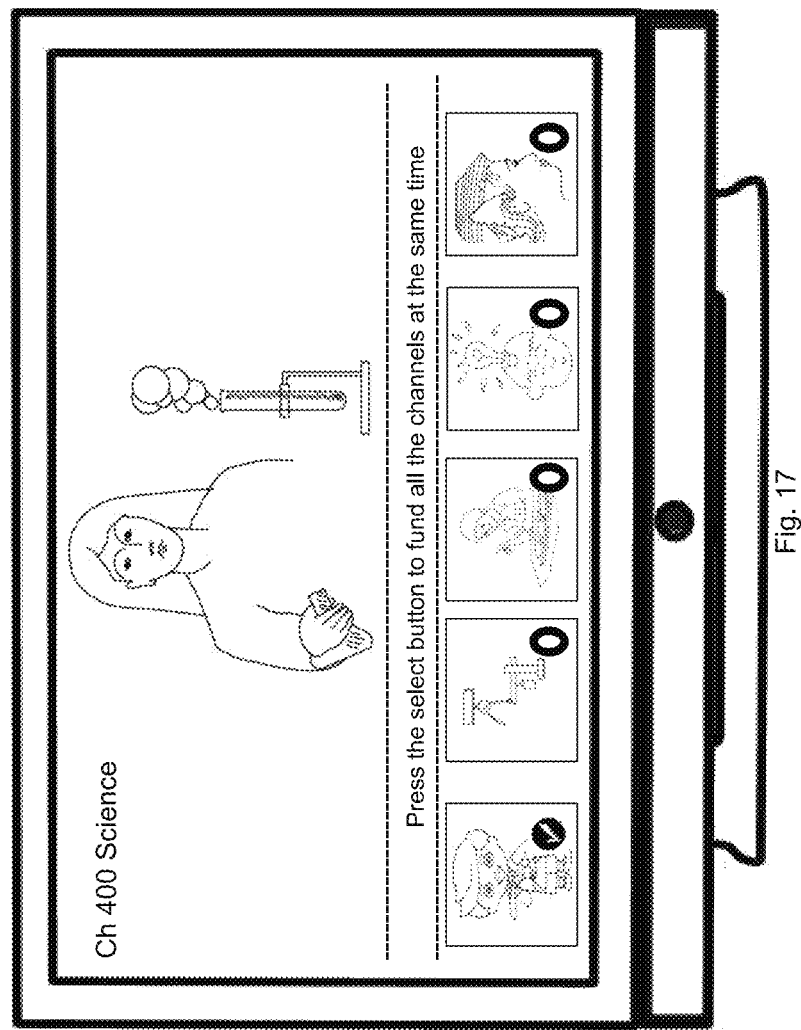
FIG. 17 shows the ability to promote related campaigns with the IPTV crowdfunding system including live-to-VOD clips, on-the-fly integrated EPG information on the screen, with multiple programming offerings and funding campaign videos in which at least one of the embodiments of this invention is implemented.

FIG. 17 shows the ability to promote related campaigns with the IPTV crowdfunding system including live-to-VOD clips, on-the-fly integrated EPG information on the screen, with multiple programming offerings and funding campaign videos. The user is able to select multiple related campaigns for backing all at the same time. It is also possible to divide a single amount of funding into equal parts for equal funding of each of the related campaigns.

Figure 18:
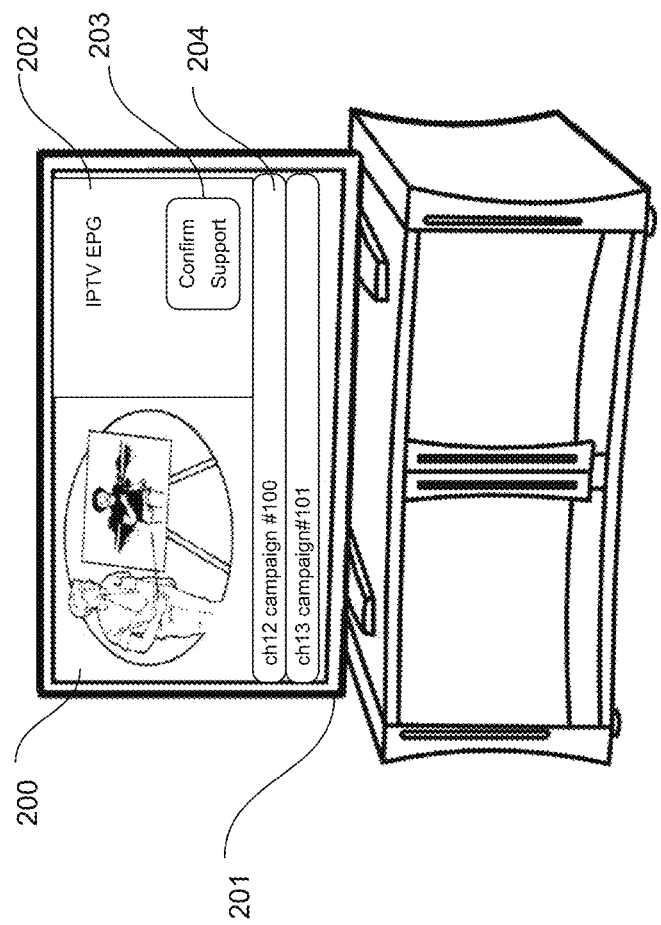
FIG. 18 shows the IPTV crowdfunding system with programming content including a live broadcast video, and integrated EPG information, with the option of backing the campaign in which at least one of the embodiments of this invention is implemented.

FIG. 18 shows the IPTV crowdfunding system with programming content including a live broadcast video 200, and integrated EPG information, with the option of backing the campaign. It is possible to back a campaign using a button that appears next to the video, and the process of backing the campaign can be completed while the video is playing. FIG. 18 also shows a live campaign screen 201, an EPG integrated information on screen 202, a Support button 203, and a Campaigns menu 204.

Figure 19:
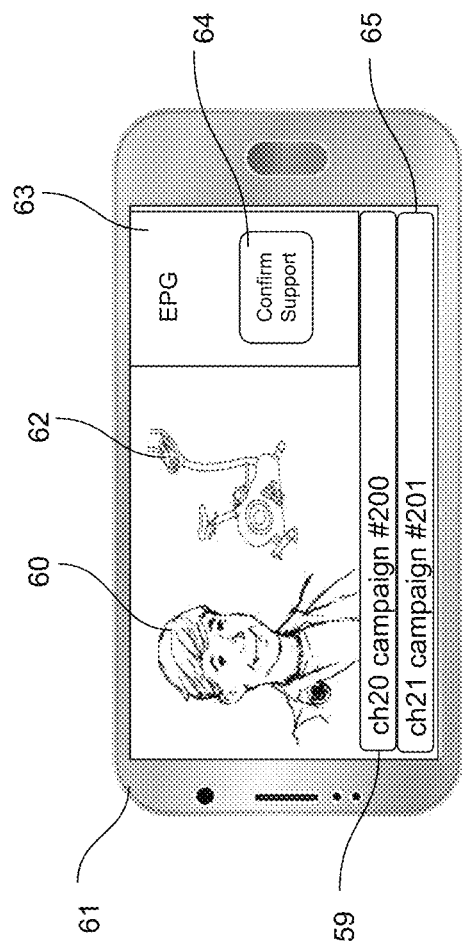
FIG. 19 shows the IPTV crowdfunding system including live programming content, integrated EPG information, and a campaign overview screen as viewed on a smartphone in which at least one of the embodiments of this invention is implemented

FIG. 19 shows the IPTV crowdfunding system including live programming content, integrated EPG information, and a campaign overview screen as viewed on a smartphone 61. There is also an in-frame navigation menu. FIG. 19 also shows a featured product 62, a video of campaign creator 60, a campaign channels menu 59, an EPG information for mobile devices 63, a support Button 64, and a campaign menu button 65.

Figure 20:
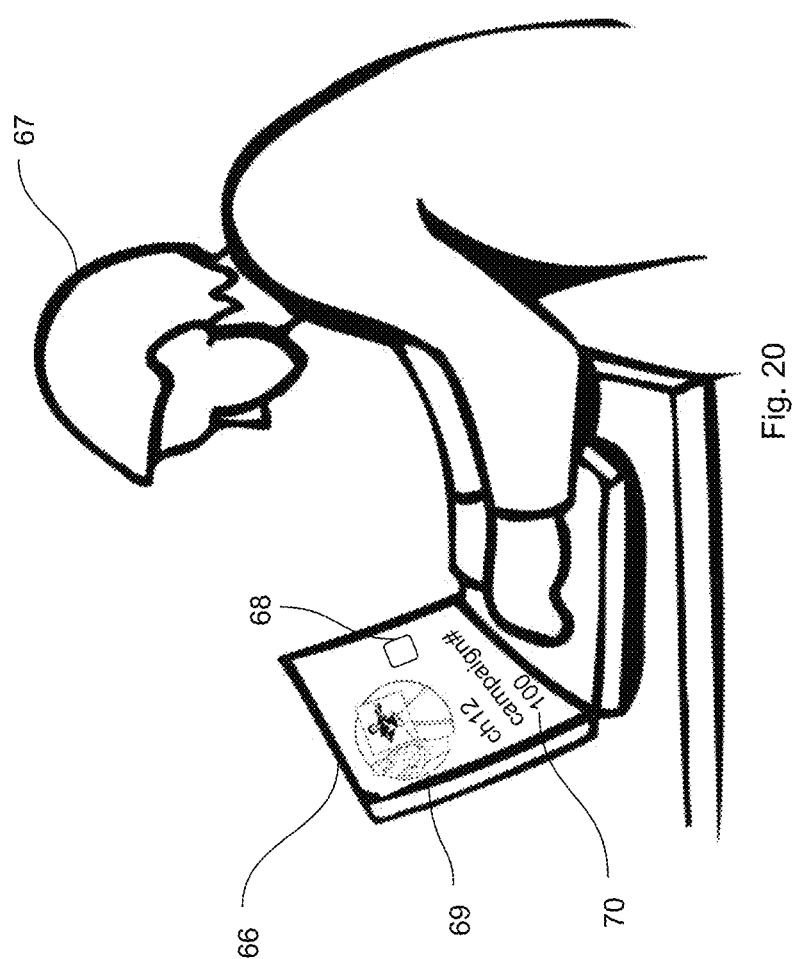
FIG. 20 shows a user viewing a campaign overview screen on the IPTV crowdfunding system, formatted for a personal computer in which at least one of the embodiments of this invention is implemented.

FIG. 20 shows a user viewing a campaign video 69 on a campaign overview screen of the IPTV crowdfunding system, formatted for a personal computer 66. The user may be a backer or a campaign creator. FIG. 20 also shows a Support Button 68 and a campaign title 70.

Figure 21:
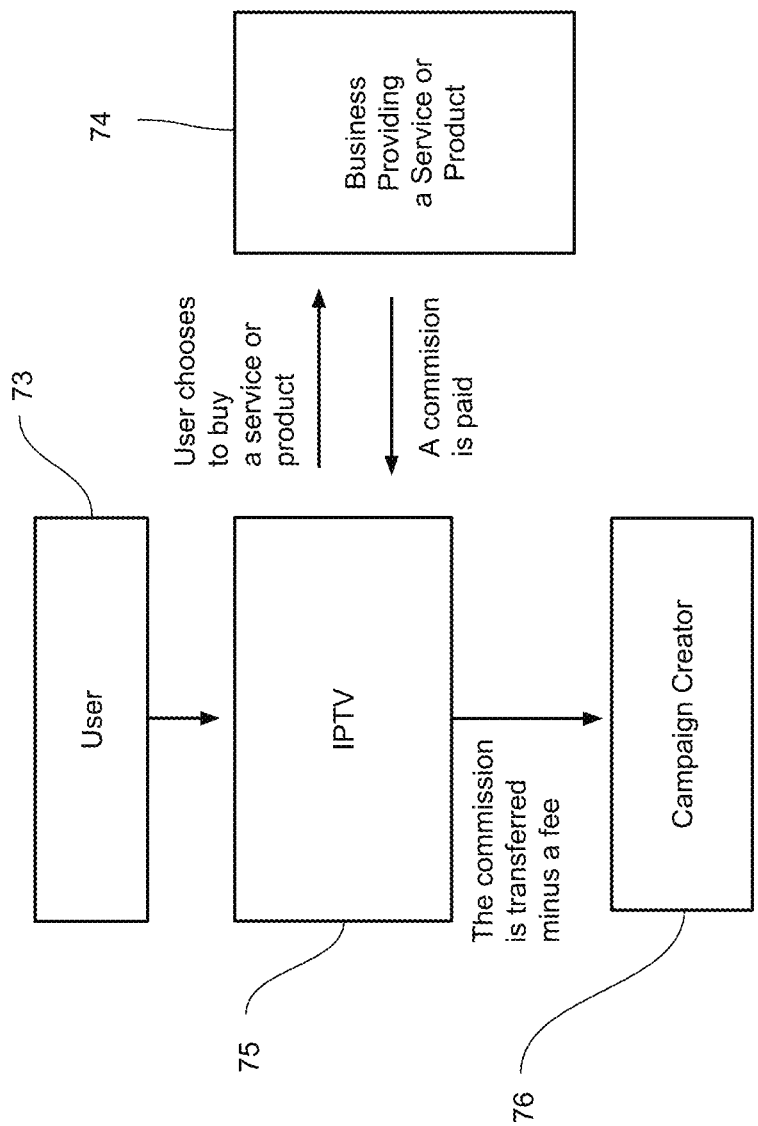
FIG. 21 shows how a user of the IPTV crowdfunding system or mobile application can choose to back a campaign by choosing to buy a service or product in which at least one of the embodiments of this invention is implemented.

FIG. 21 shows how a user 73 of the IPTV crowdfunding system or mobile application can choose to back a campaign by choosing to buy a service or product through a third party business network 74 by submitting a request and performing a transaction with the third party business via the IPTV crowdfunding Network 75. The company whose product or service is purchased pays a commission, which is transferred to the campaign creator 76, minus a fee that is retained by the IPTV crowdfunding company.

Figure 22:
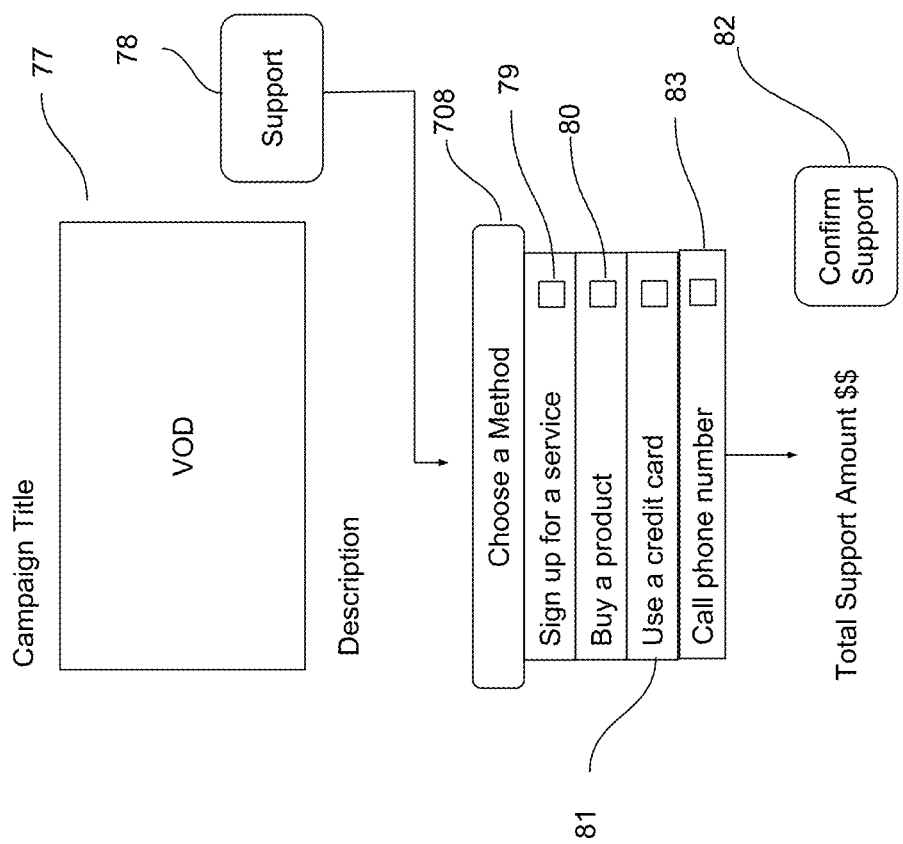
FIG. 22 shows how a user of the IPTV crowdfunding system or mobile application can see a screen displaying the title of the campaign and a description; a video can also appear on the same screen in which at least one of the embodiments of this invention is implemented.

FIG. 22 shows how a user of the IPTV crowdfunding system or mobile application can see a screen displaying the title of the campaign and a description, where a video 77 can also appear on the same screen. On the screen also appears a button 78 that, if pressed, allows the user to support the campaign. Once the user presses the button, a new screen or popup menu 708 appears in which the user can choose how they would like to support the campaign by choosing to call a phone number 83, buy a product 80, buy a service 79, making a direct payment 81 using a credit card, or another means of payment. The user might enter any number of different screens that will assist them in purchasing a product or service and entering their billing or credit card information or other means of payment. After each method of payment or funding is used, a funding amount will appear that totals all the different methods of funding which will be directed to the campaign. A button may be pressed to confirm and finalize the transaction 82.

Figure 23:
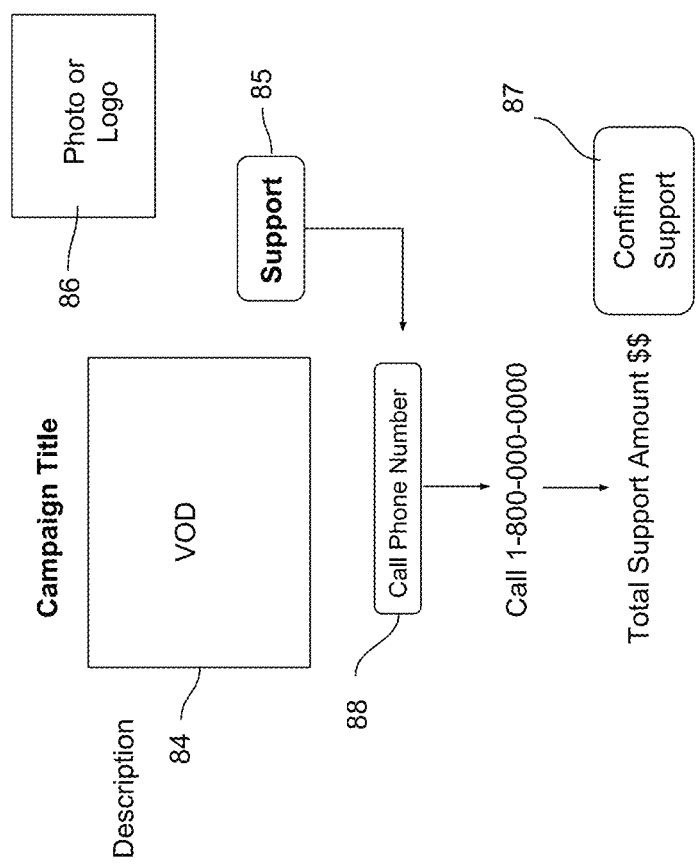
FIG. 23 shows an embodiment of the IPTV crowdfunding system comprising a method of funding a campaign in which a backer chooses to participate in a sales call in which they will hear a short sales presentation in which at least one of the embodiments of this invention is implemented.

FIG. 23 shows an embodiment of the IPTV crowdfunding system comprising a method of funding a campaign in which a backer chooses to participate in a sales call in which they will hear a short sales presentation. They may also be asked to answer some questions and remain on the call for a certain duration of time. If they complete the call successfully, then a fee would be charged to the advertiser and that money would be directed to a campaign. FIG. 23 also shows a video on demand 84, a support button 85, a photo or logo 86, confirm support button 87, and call phone number method button 88.

Figure 24:
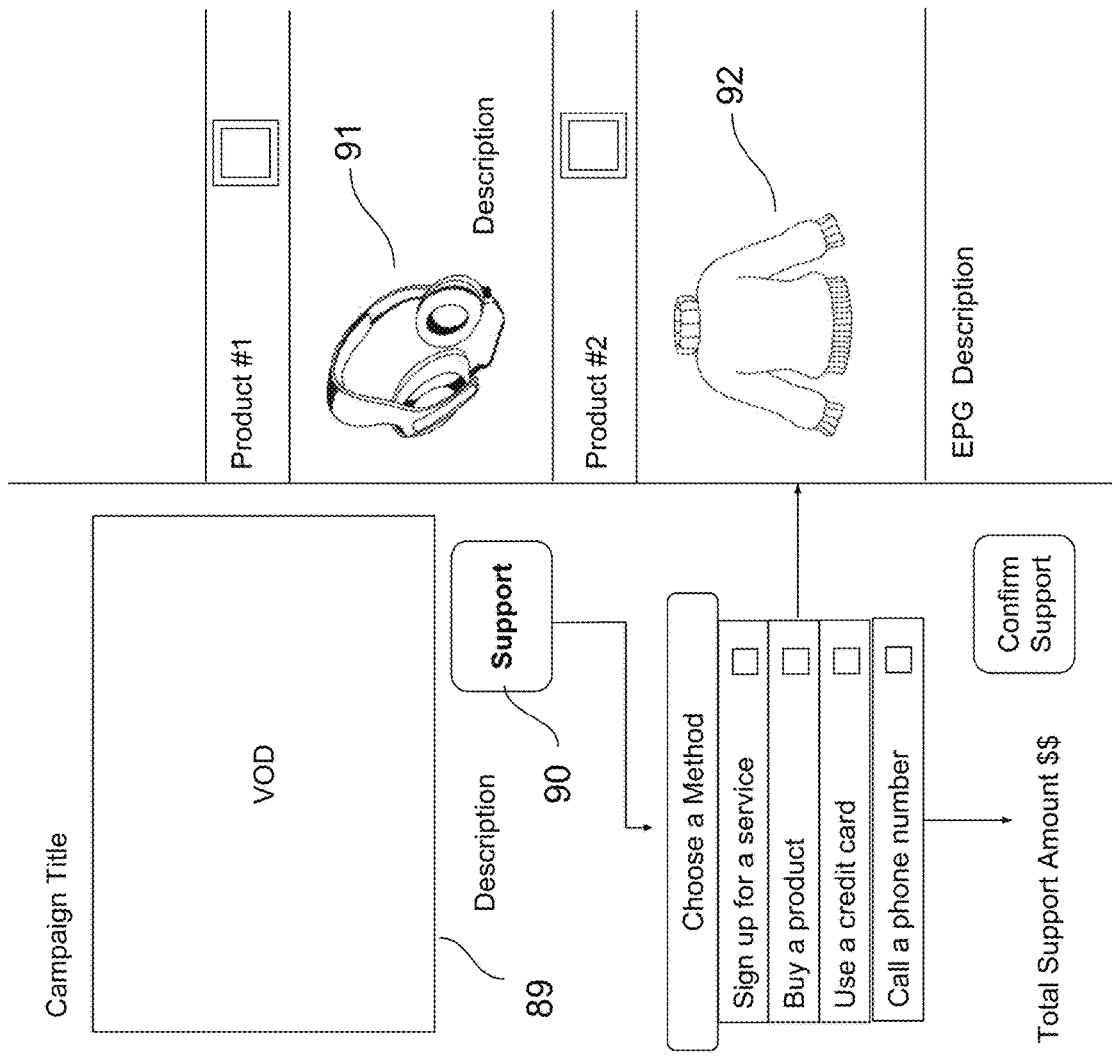
FIG. 24 shows that it is possible for a user to choose to support a campaign through purchasing products in which at least one of the embodiments of this invention is implemented.

FIG. 24 shows that it is possible for a user to choose to support a campaign shown on a VOD 89 through purchasing products, such as 91 and 92. If a user chooses to use this method to support a campaign, they will be presented with any number of products which they can buy using a credit card or other payment method. Some products that a user might purchase in order to support a campaign might be consumer electronics, computer equipment, clothing, toys, furniture, or any other product which can be bought online with the assistance of a support button 90.

Figure 25:
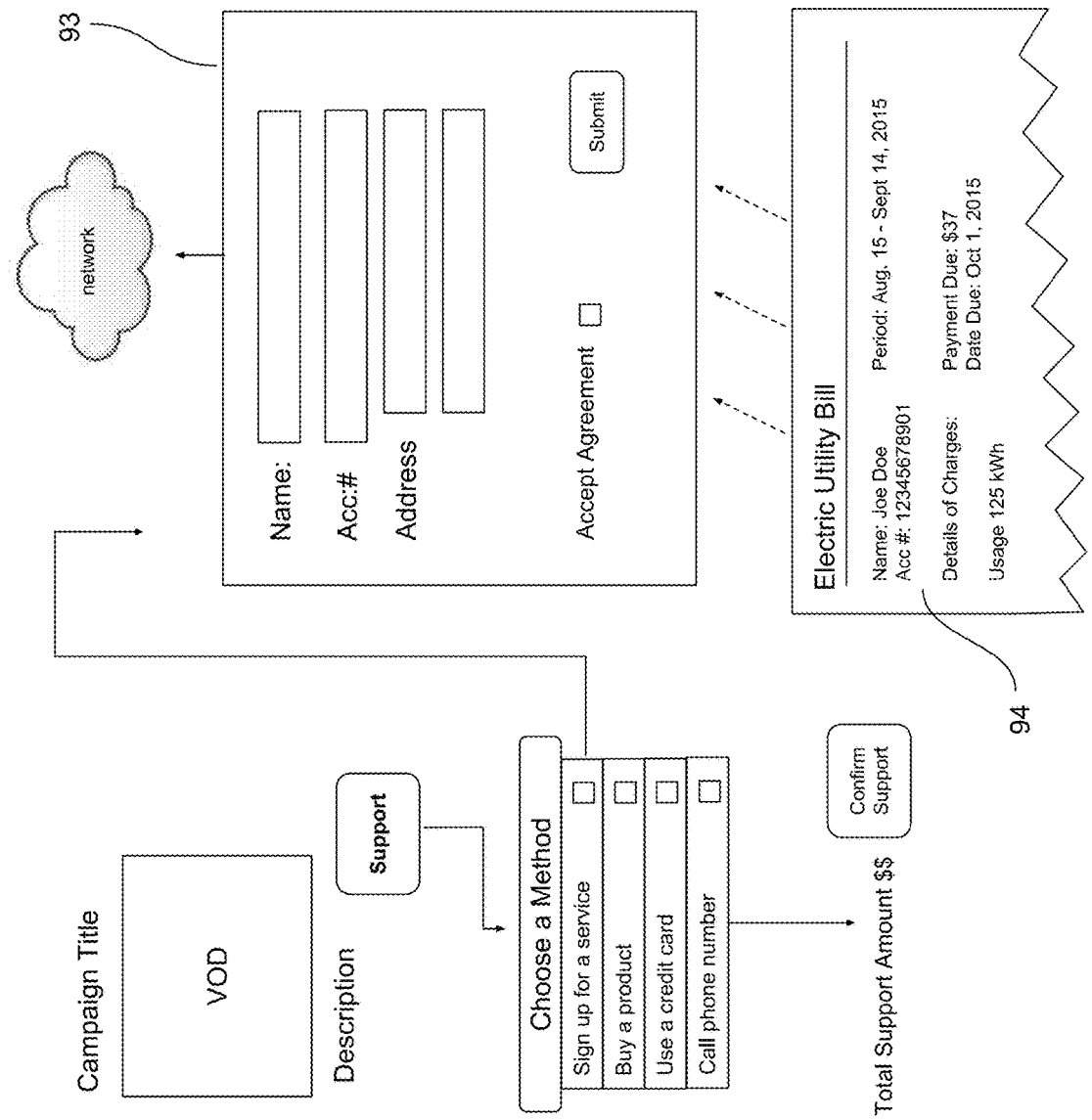
FIG. 25 shows, using the IPTV crowdfunding system, that it is possible to support a campaign by purchasing utilities, such as electricity, in which at least one of the embodiments of this invention is implemented.

FIG. 25 shows, using the IPTV crowdfunding system, that it is possible to support a campaign by purchasing utilities, such as electricity. If a user selects this option in order to support a campaign, they will be directed to enter information from their electric bill 94, including their account number, and any number of additional data required to sign up for new electric services. Once the user has completed the form 93, and the information is verified, a commission can be directed to support a campaign.

Figure 26:
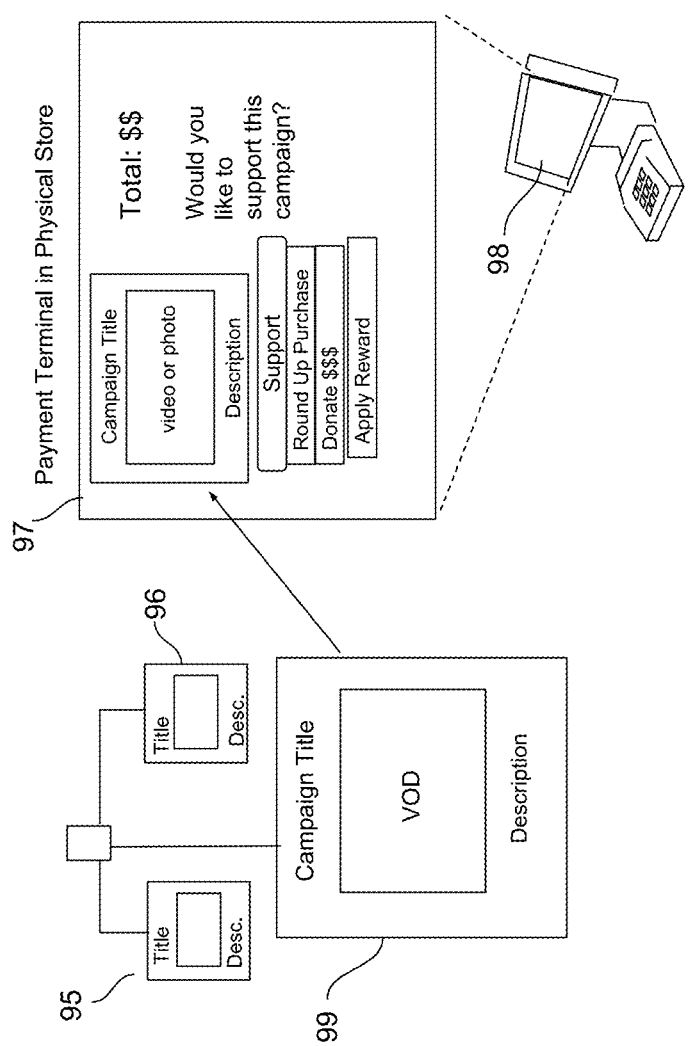
FIG. 26 shows, with the IPTV crowdfunding system, that it is possible for campaigns to be funded at the point of sale in physical stores, kiosks, or within mobile point of sale devices in which at least one of the embodiments of this invention is implemented.

FIG. 26 shows, with the IPTV crowdfunding system, that it is possible for campaigns to be funded at the point of sale in physical stores, kiosks, or within mobile point of sale devices. At the point of checkout, a customer can be asked if they would like to support a campaign of their choice. One or more campaigns, such as 95, 96, and 9 can be displayed on the point of sale device 97, and the user can choose to support the campaign using methods including, rounding up the total amount of their purchase to the nearest dollar, adding an additional amount of money to the total, or transferring a reward or credit based on membership in a rewards program. A point of sale device 98 may also include websites and apps running on a client device, including a smartphone, tablet, or personal computer.

Figure 27:
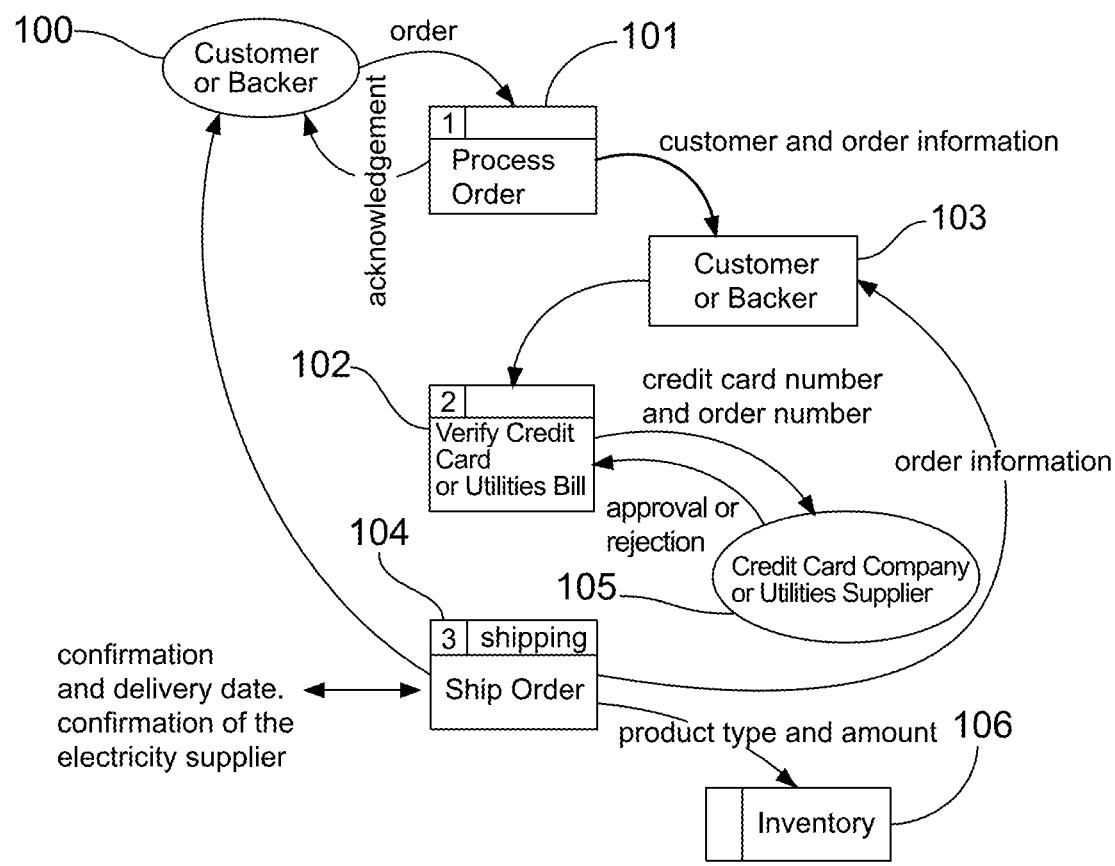
FIG. 27 shows an aspect of a particular embodiment of the IPTV crowdfunding system including a number of steps in which a campaign is supported by either purchasing a product or service in which at least one of the embodiments of this invention is implemented.

FIG. 27 shows an aspect of a particular embodiment of the IPTV crowdfunding system including a number of steps in which a campaign is supported by either purchasing a product or service.

Figure 28:
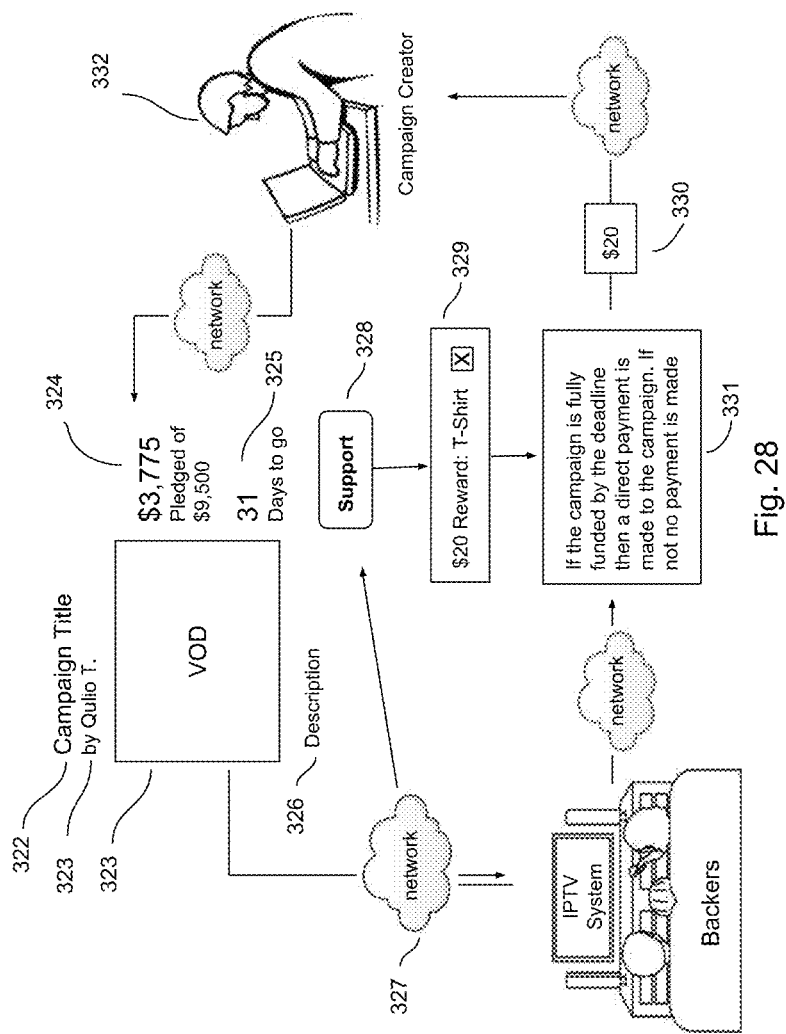
FIG. 28 shows the IPTV crowdfunding system wherein a campaign is created by a campaign creator, a backer pledges money, chooses a reward, and if the campaign raises enough money to reach the campaign goal, a direct payment is made from the backer to the campaign in which at least one of the embodiments of this invention is implemented.

FIG. 28 shows the IPTV crowdfunding system wherein a campaign is created by a campaign creator, a backer pledges money, chooses a reward, and if the campaign raises enough money to reach the campaign goal, a direct payment is made from the backer to the campaign.

Figure 29:
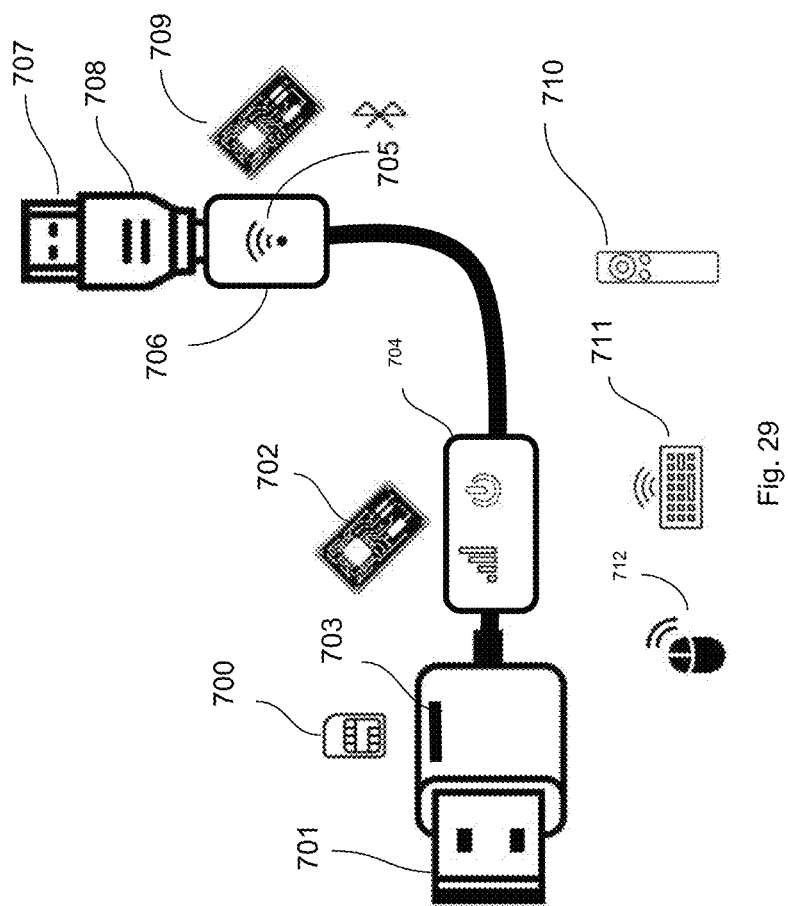
FIG. 29 shows an originally invented device we call the "HDMI CABLE device" in which at least one of the embodiments of this invention is implemented.

FIG. 29 shows an originally invented device herein referred to as the "HDMI Cable device" that may comprise a HDMI plug 707, a HDMI Plug Crimp Connector 708, and a PCB board 709, where the board is inserted or assembled inside the cable assembly. The HDMI Cable device may also comprise a WIFI or Bluetooth connection to other devices 705 and a PCB board that contains a 5g modem 702 that is inserted or assembled inside the cable assembly, where it has an on and off button and shows a cell signal bar 704. In addition, the HDMI Cable device may comprise a SIM card 700 and either a SIM card slot or a SIM Card Reader 703. Furthermore, the HDMI Cable device may comprise an USB PLUG 701, a remote control 710, wireless keyboard 711, and wireless mouse 712. This device provides access to the IPTV crowdfunding system or other IPTV systems including Roku, Amazon Fire, Apple TV, or Google TV.

Figure 30:
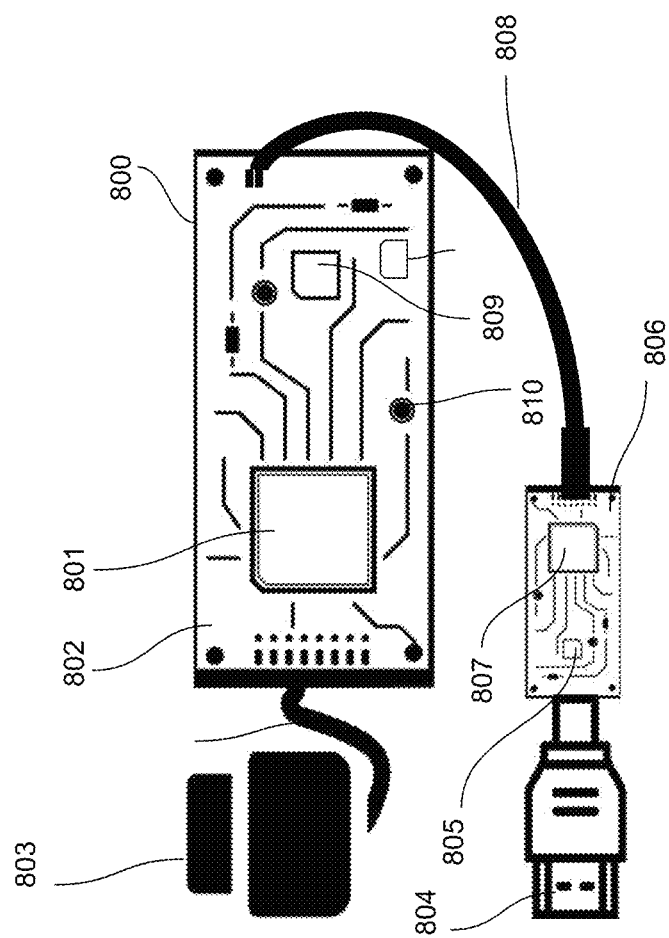
FIG. 30 shows an originally invented device which we call the "HDMI CABLE device" in which at least one of the embodiments of this invention is implemented.

FIG. 30 also shows an embodiment of the "HDMI Cable device," comprising a processor or wireless modem with SOC 801, with software which has access to our IPTV crowdfunding system; a USB PLUG connecting to a USB port that gives power 803, where this voltage is received by a Printed Circuit Board (PCB) board 802; a USB PLUG 803 with a SIM card slot or SIM card reader connected to the PCB board 802, which has a processor or modem 801 to authorize the subscription from a telecom provider or mobile provider, a video processor 809, and an antenna for receiving a signal from a mobile provider 810. The signals which the device can use for sending and receiving data are: Wi-Fi, LTE network, 5G network, LTE advanced pro, 5G mmWave, 4g, and WiMAX. The signals are processed by 801.

PCB Board 800 has a modem. When the modem receives the signal from the provider, it converts the data signal, and sends it via the cable 808, which is the cable that connects to the PCB 806. There is at least one wireless module or video processor or CPU coupled to 806, which is the printed circuit board coupled to an antenna 805. The antenna sends and receives a Wi-Fi signal to any device. The HDMI plug 804 connects to a display or television allowing a user to watch a video displayed in 4K UHD format, high-definition television, or in any resolution including 1080p.

Figure 31:
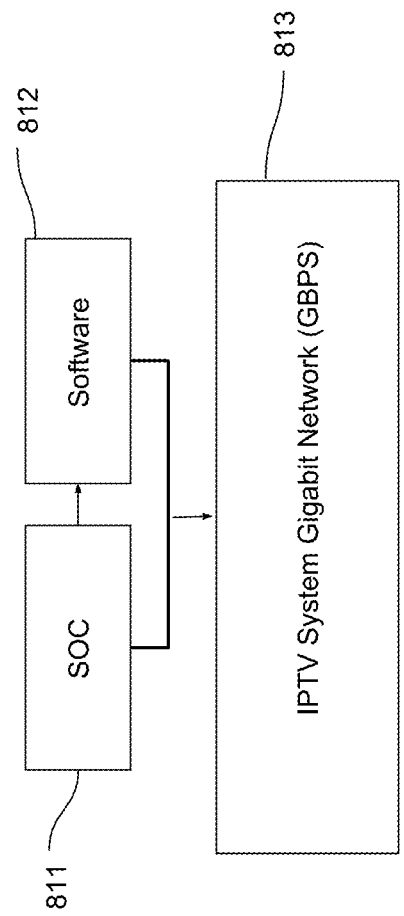
FIG. 31 shows a system including the HDMI cable device connected to the IPTV crowdfunding system comprising a gigabit network, an operating system software and a System On a Chip (SOC) in which at least one of the embodiments of this invention is implemented.

FIG. 31 shows an IPTV system with GBPS data speeds 813 including the HDMI cable device connected to the IPTV crowdfunding system comprising a gigabit network, an operating system software 812 and a SOC 811.

Figure 32:
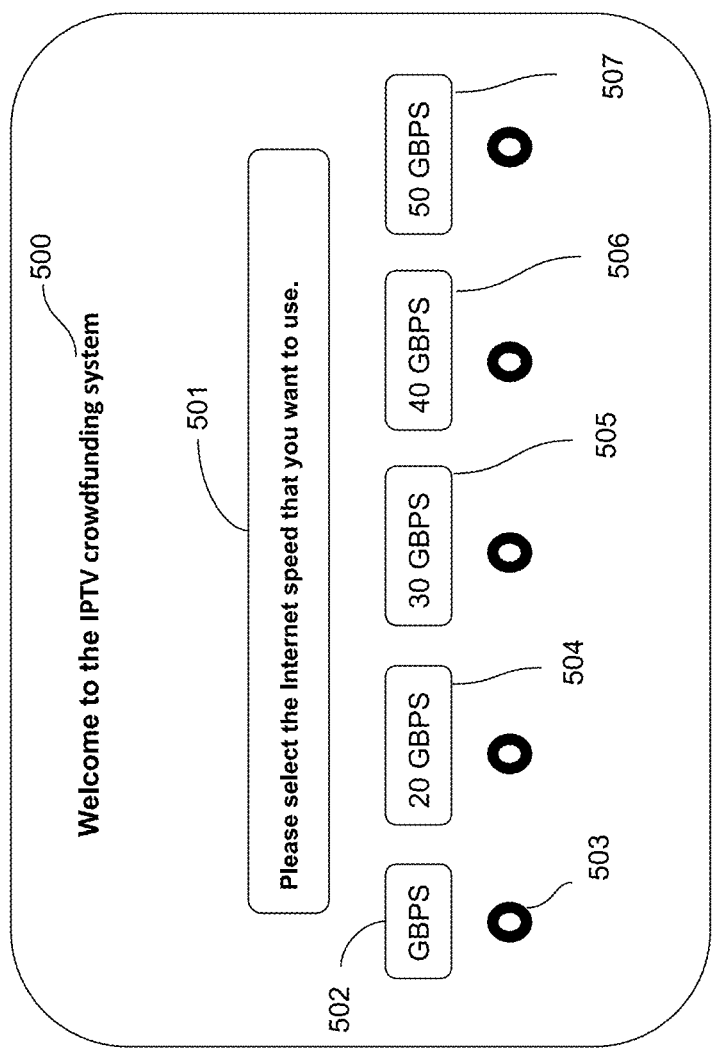
FIG. 32 shows when the user is already subscribed to the IPTV crowdfunding system and is optionally prompted to select her broadband internet in GBPS (billions of bits per second) 500 in which at least one of the embodiments of this invention is implemented.

FIG. 32 shows when the user is already subscribed to the IPTV crowdfunding system and is optionally prompted to select her broadband internet in GBPS 500. The user will use the system 501 to select internet speed 503. The user determines her internet in GBPS 502. The user determines her internet download speeds as high as 20 GBPS 504, 30 GBPS 505, 40 GBPS 506, or 50 GBPS 507. It is also possible for the IPTV crowdfunding system to automatically determine the optimal internet speed for the user.

Figure 33:
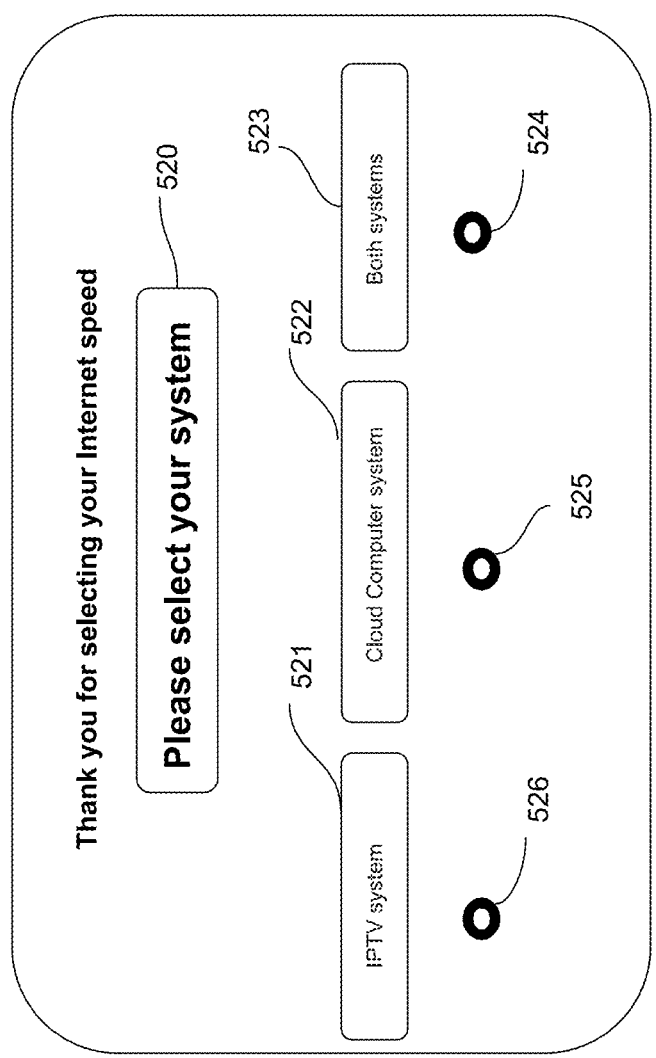
FIG. 33 shows how after the user has already selected the internet speed the user can also select the system of preference in which at least one of the embodiments of this invention is implemented.

FIG. 33 shows the user can also select the system of preference. The options include the IPTV crowdfunding system 521, cloud computer system 522, and both systems 523. FIG. 33 also shows a selective interface 520 that the user clicks or selects. In addition, FIG. 33 shows more interface buttons, such as 524, 525, and 526 for selecting an operating system as a user preference.

Figure 34:
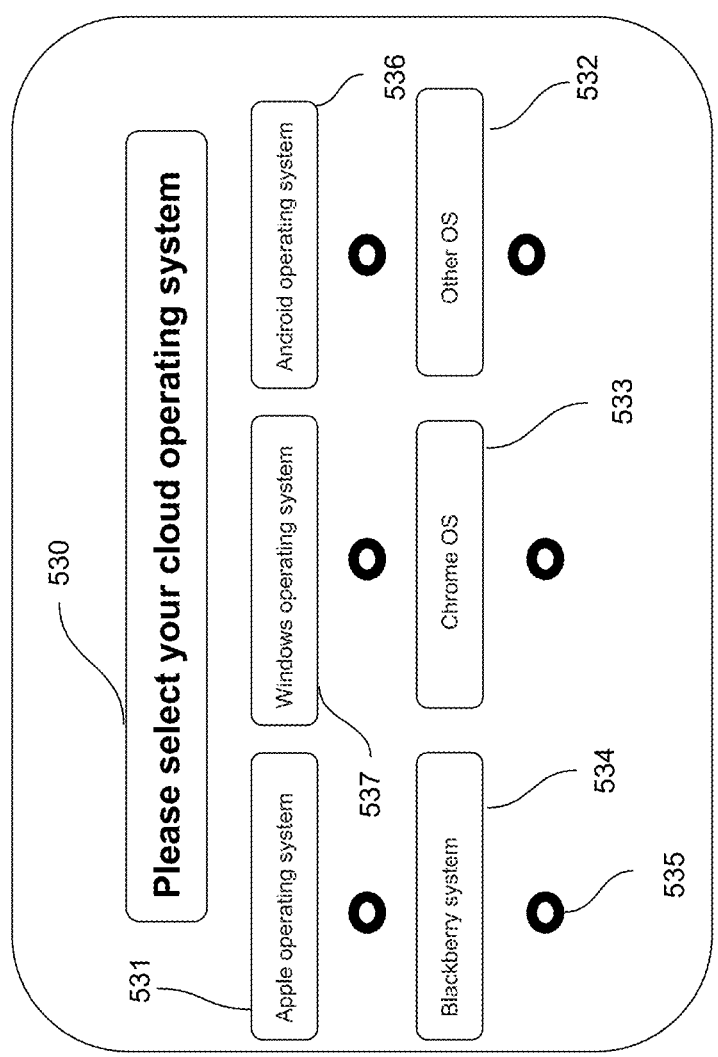
FIG. 34 shows how once the user has determined the system of her preference she is also able to select her operating system 530, in which at least one of the embodiments of this invention is implemented.

FIG. 34 shows the user is also able to select her Operating System (OS) 530, including the Apple OS 531, the Microsoft Windows OS 537, the Android OS 536, the Blackberry OS 534, the Google Chrome OS 533, or any other OS 532. FIG. 34 also shows detail 535 where the user accepts the terms and conditions of operations, performance, and privacy.

Figure 35:
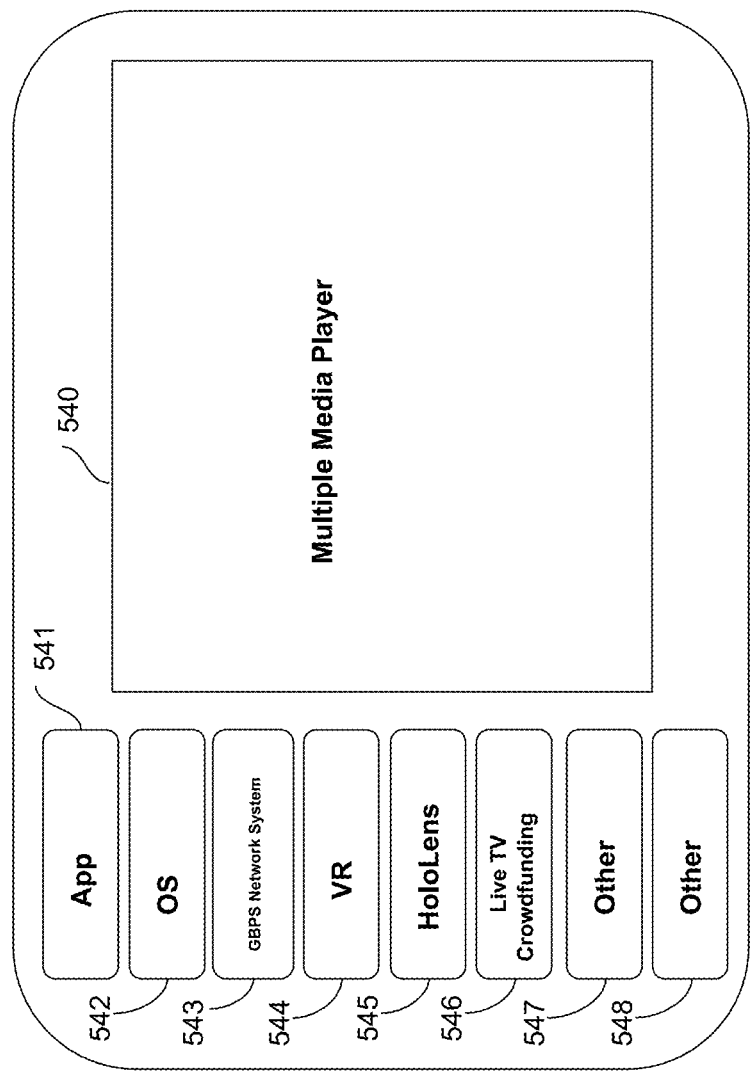
FIG. 35 shows a multiple media player in which at least one of the embodiments of this invention is implemented.

FIG. 35 shows how the user can enjoy the system including, an augmented reality device or virtual reality device including HoloLens 545, live television and crowdfunding where the user can fund campaigns 546, other systems 547 and 548, and a multiple media player that is used to view live television or other media 540.

FIG. 35 also shows service offering applications such as, web browser, e-mail capabilities, video-conferencing or any app 541 available in the market with any number of functions running on the OS 542, which is the operating system that the user previously selected. The user only has to select the button, to use the operating system over a gigabit network 543 that has speeds measured in GBPS. In addition, FIG. 36 also shows a VR button 544 for launching AR or VR enabled apps.

Figure 36:
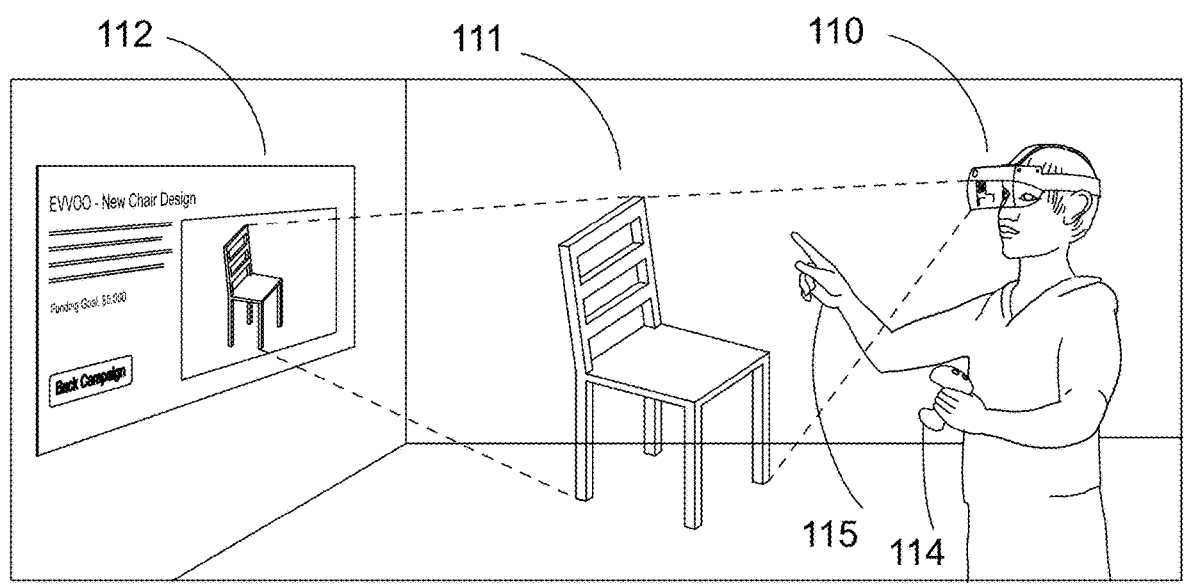
FIG. 36 shows how the user can enjoy the system including, an Augmented Reality (AR) device or virtual reality device including HoloLens 545, live television and crowdfunding in which at least one of the embodiments of this invention is implemented.

FIG. 36 shows a user 115 using motion controllers 114 and hand gestures 115, and combinations thereof, with an AR headset, i.e. Hololens, 110, where the user is viewing a campaign overview from the IPTV crowdfunding system using mixed reality including a virtual screen, window, or desktop 112. A 3D model of the item, i.e. a chair, 111 in the campaign overview video is displayed in virtual 3D space, in order for the user to better understand the item that is part of the campaign. It is also possible to view 3D models and back campaigns using the buttons on the hand controllers, voice commands, hand gestures, or other methods of input using an AR and VR system.

Figure 37:
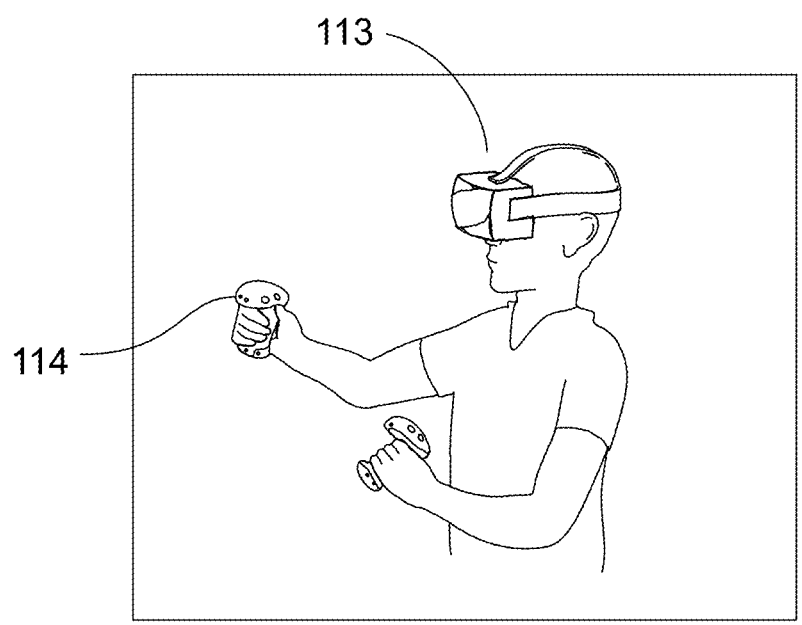
FIG. 37 shows another view of an augmented reality device or Virtual Reality (VR) device in which at least one of the embodiments of this invention is implemented.

FIG. 37 also shows a user using motion controllers 114 with a VR headset 113.

At least one embodiment of the invention is illustrated in FIG. 2. This shows a method of crowdfunding, where campaign information is received from at least one campaign creator through an IPTV crowdfunding system over an IP network to a host computer with a non-transitory computer readable medium. The campaign information is stored on the host computer and displayed on a device, such as a digital television, a video projector, a computer monitor, a smartwatch, a smartphone, or a tablet.

The IPTV crowdfunding system generates a campaign overview with a support button or support link to support a campaign and identify a backer of the campaign. The IPTV crowdfunding system operates by receiving a funding commitment from at least one campaign backer through an electronic device over an IP network to a host computer with a non-transitory computer readable medium. The IPTV crowdfunding system also sends the funding commitment to the campaign creator.

The campaign information may also be transmitted to a third party point of sale device, where one or more users can make a funding commitment to a campaign. To complete a transaction via a point of sale device, the user chooses their funding amount on the 3rd party device and a funding amount is transferred to the IPTV crowdfunding system.

The campaign information may comprise a title, description, funding amount, and identifier of the campaign creator. The campaign information may also comprise recorded video content, VOD, live video content, live streaming video, pictures, live text chat, live voice chat, and live video chat.

The support button associated with the crowdfunding campaign is displayed on a device, such as a digital television, with a remote control, app, or other digital device that allows for IPTV crowdfunding. Backers may support a campaign with other forms of input such as a voice command, hand gestures, or body movement. Backers may also support a campaign with an electronic device with a display, allowing for one-touch and two-touch backing of campaigns. The electronic device may also be a personal computer, smart phone, digital tablet, smart watch, camera, or another media device. It is also possible to use multiple devices in combination, for example if a user has a smart home speaker or other smart home device with a microphone that is connected to the IPTV crowdfunding system over a network, it is possible to send commands via the smart home device to another device, for instance a digital television, including a command to "click" on a support link for a campaign. In addition, the electronic device may be a VR headset, an augmented reality headset, or a combination of the two. Backers may make a funding commitment for crowdfunding fundraising by either direct payment, buying a product, buying a service, or reward points.

As shown in FIG. 2, the IPTV crowdfunding system comprises, IPTV encoders, VOD servers, network switches, IPTV gateways, middleware, an EPG, middleware servers, IPTV management servers, switches, and data storage. The middleware software may include a graphical user interface, a codec manager, a conditional access manager, a conditional access interface, a crowdfunding campaign management interface, a media interface, an events interface, a system settings interface, a 3rd party system interface, or a presentation manager.

In at least one embodiment, the IPTV crowdfunding fundraising apparatus is constructed using at least one electronic device, host computer, display device, and HDMI Cable device. Means are provided for connecting the electronic device, host computer, display device, and HDMI Cable device. As configured, the IPTV crowdfunding fundraising apparatus provides a means for displaying video content on a digital television for a campaign backer, where he may interact with the campaign creator by making a funding commitment. The campaign creator may transmit crowdfunding fundraising requests to a display device so that a campaign backer may interact with the campaign creator and make a funding commitment.

In at least one embodiment, the IPTV crowdfunding fundraising apparatus may include an electronic device, including a personal computer, smart phone, digital tablet, smart watch, camera, or media device. The electronic device may also be a VR headset, augmented reality headset, or combination thereof. The display device may be a digital television, a video projector, a computer monitor, a smartwatch, smartphone, or tablet.

In at least one embodiment, the IPTV crowdfunding fundraising apparatus may include a HDMI Cable device. The HDMI Cable device is constructed from a USB plug, a USB port, a PCB board with a processor or modem, a SIM card slot, a video processor, an antenna for receiving a signal from a mobile provider, and a processor or wireless modem with SOC. In addition, the HDMI Cable device has software to access an IPTV crowdfunding system, whereby it may authorize the subscription from a telecom provider. The signals that the HDMI Cable device may use for sending and receiving data may be Wi-Fi, LTE network, 5G network, LTE advanced pro, 5G mmWave, 4g, or WiMAX.

As shown in FIG. 2, a user who creates a campaign does so by creating an account using a personal computer 19, smartphone 20, or other device. They can also use their IPTV television interface 71, shown in FIG. 3. The account may require the user to choose a username and password, or if the user is logged into their IPTV crowdfunding system, it is possible to create an account automatically, by allowing the IPTV service provider to verify and transfer basic personal information. If it is not possible to have the IPTV service provider automatically transfer basic personal information, the user may have to input some personal details, such as their name and their address. A creator may also input details about their bank account, including an account number and routing number. It is possible with our system to send money directly to accounts using direct depositing. It is also possible to mail a physical check to the user, if their campaign is successful, or to pay via other methods including PayPal or Google Wallet. Whichever method a creator chooses, they will need to input the information required by that method to have any successfully received campaign funds transferred to them.

A creator will build their campaign online using a graphic user interface which will allow for the input of a campaign title, description, duration of the campaign, and funding goal. They will also be prompted to upload a video and any supporting images. Once all the necessary information is inputted by a creator, the campaign can be either immediately published on the IPTV broadcast and mobile application or it can first be reviewed by an administrator of the system, before being approved and published.

Once all the necessary information has been input into the IPTV based system or mobile application, creators will be able to choose the different methods they would like to offer to users in order to support their campaign.

The creator of the campaign can select all the forms of support assigned to the campaign. If a creator only wants their backers to be able to support them by choosing a new supplier of electricity, the creator will be able to limit support to only that method. When, with an IPTV-ready device or mobile device, a user navigates on to the home screen of the crowdfunding network shown in FIG. 11, from the previous screen shown in FIG. 10, they will be able to click on featured campaigns, click on a category of campaigns, click on a keyword tag linked to a subset of campaigns, or enter a text string into a search box in order to search for campaigns. Once a user using one of the methods above reaches a campaign, the first screen will be the campaign overview screen, shown in FIG. 12, 16, 18, 19, 20. The overview screen will feature a campaign title, a campaign description, and may also include a video and still images. There will also be a button on every campaign overview screen that may be clicked in order to support—or back—the campaign.

If a user chooses to support a project, they can initiate the process by clicking on an easy-to-see button, or otherwise expressing their intent to back the campaign, including using a voice recognition system within the IPTV-ready device or mobile device, as shown in FIG. 28. It should be understood that within this disclosure the words project and campaign may be used synonymously. The button 328 can be labeled "Support", "Back this Project," or similar wording. It should be understood that within this disclosure that supporting a campaign or backing a campaign have the same meaning. It is also possible to use other words such as but not limited to "donate", "lend", "invest", "pay", "purchase", "give", "gift", "endow" or other terms which are appropriate to the particular embodiment of the IPTV crowdfunding system, including but not limited to donation, rewards, lending, and equity based crowdfunding, where the key term is used for the same purpose—to initiate the funding of a campaign. Clicking on the button will lead to a screen which will allow users to select a method of support, which is referred to as the "support methods screen," shown in FIG. 15. Additionally it is possible for a popup, dropdown, or pullout menu to be triggered by the users choosing to support or back the campaign, shown in FIG. 12.

In this system, users can choose alternative methods of supporting a campaign, other than direct payment, including purchasing products and services 51, engaging in marketing activities, and successfully getting other people to purchase products and services or engage in marketing activities. It is also possible to support a campaign through direct payment, for instance using a credit card 52.

If a user decides to support a campaign by purchasing a product or service, she will click on a link leading to a screen, which can either be within our IPTV crowdfunding system or mobile application or also on another website. This will include an on-screen form or mobile application form 93 allowing for the necessary information to be entered by the web users in order to complete the purchase of the product or service, as shown for one embodiment of the system in FIG. 25. If the form resides on the network or on a mobile application, then the information can be transferred to a third party, if necessary. If the transaction is successful, the third party will send back a confirmation message, stating that the purchase was successful and providing the system with the dollar amount allotted to the campaign. Funds can be raised using this method, because many product and service providers are able to pay a commission for the help in creating a new customer for them. One example of a product or service is the purchasing of energy, including electricity and gas, as a method for supporting a campaign 94.

If a user chooses to support a campaign by purchasing a utility, like electricity or gas, through the site, they will be able to click on a link on the support methods screen, leading to a form 93. The form will require the user to enter their name, billing address, zip code, account number, which can be found on a bill from the original electric company, and confirm their interest in purchasing their electricity from the company presented on the system. Other pieces of information might be required to be entered as well.

Once all the forms are completed, and the user has successfully purchased their electricity from a new company, a message will be sent from the company to our system including a confirmation identifying the information of the user, the date and time of the transaction, and a commission amount.

If the transaction is successful then the user will be directed back to the support methods screen shown in FIG. 22, which will show the commission dollar amount that will be directed to fund the campaign of the user's choice. If the user chooses, they can click on another method of support, in order to increase the amount of money allotted to the campaign. The reason why users may find purchasing a utility, like electricity, convenient is because there are no up-front costs. Also, they will continue to pay for electricity in the same way they paid before. It may also be possible to reduce their overall electricity bill by purchasing their electricity through the system.

Other possible products and services which could be used as funding methods include utilities other than electricity, such as gas, digital services, internet access, video streaming services, insurance products, renter's insurance, car insurance, legal insurance, transportation services, airline tickets, hotel and car rentals, and subscriptions to car sharing services. Other possible products and services include physical storage and moving services, renting a self-storage locker, hiring movers, or subscribing to storage services that include pickup and drop off. Possible funding methods may also include purchasing products from online retailers such as Amazon, computer equipment, audio and camera equipment, toys, household items, cleaning products, clothes, transportation products such as cars and bicycles, and holiday products such as wrapping paper and decorations. Because of the vast amount of products and services that can easily be purchased online, the system could direct users to purchase any number of different products and services, which would lead to funding being direct to the campaign they want to support.

It is also possible to allow users to support the campaign of their choice by engaging in a conversation with a salesperson 83. This method would require the user to call a phone number, talk with a salesperson for a predefined amount of time, but would not require them to purchase any products or services.

Another method a user could use to fund a campaign is to engage in marketing activities which could be tracked by the system. One example is if a user chooses to promote a product on social media. They might be directed to include a key phrase on their Twitter, Facebook, or Instagram account. For example, the IPTV crowdfunding system described in at least one embodiment may verify that the key phrase did appear on their social media account and for that service a fee could be charged to the advertiser, which could then be directed toward funding a campaign.

Once a user who is supporting a campaign has completed at least one method of funding for the campaign they want to support, they can click on a button which will appear on the support methods screen, allowing the user to complete their funding. The button might be labeled "Confirm Support" or other label 82. Once the funding period for a campaign has ended, the total amount of funding raised for that campaign can be transferred to the owner of the campaign, minus any fees taken out by the administrators of the system.

The system also would allow for the funding of campaigns at point of sale terminals, shown in FIG. 26. These devices could be located in retail stores, kiosks, and could also be handheld for mobile applications. A point of sale device may also include websites and apps running on a client device, including a smartphone, tablet, or personal computer. Campaigns 99 which have been selected for point of sale funding could have a very basic overview screen comprising a campaign title, image or video and description included in the checkout, shopping cart, or rewards screen, or other locations on connected point of sale devices 97. A person using the point of sale device may be prompted, upon being presented with their total amount due, with the option of contributing money to the selected campaign or another campaign appearing on the device. Using the screen on the point of sale terminal it is possible to choose from a few different funding options including rounding up the total to the nearest dollar amount, adding a specified amount of money, or applying rewards credits. Once the transaction, including a funding amount made using the point of sale interface, is made, a message is sent to the IPTV crowdfunding system, and the campaign that was supported is updated to account for the additional funding amount.

In one or more of the exemplary embodiments, the IPTV crowdfunding system may be implemented by a single party, but in most cases it will be implemented by more than one in any combination, where the IPTV crowdfunding system is comprised of many hardware and software components provided by different parties. In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, DVD, floppy disk and Blu-ray disc where disks usually reproduce data magnetically, while discs reproduce data optically with lasers. Combinations of the above should also be included within the scope of computer-readable media.

In other embodiments in reference to this, for example, Linux-OS, android-OS, GNU/LINUX, KERNEL MICROSOFT WINDOWS, MS-DOS, computer hardware, CORE PROCESSOR, GNU, MIDDLEWARE CLIENT, FIREFOX BROWSER, LINUX, CHROME ANDROID, SEB PROTOCOLS, HTML 4 & 5 & 6, JAVASCRIPT, HTTP, SSL 2 & 3, IGMP V2 & V3, DHCP, SNMP, RTP/RTSP, SERVER MIDDLEWARE, SUBSCRIBER, MANAGEMENT SYSTEM WITH HTTP SERVER, TR-069 REMOTE MAINTEMANCE REMOTE, CONFIGURATION OVER HTTP, IP MULTICAST, OTT LIVE, UNICAST, VOD RTSP, ADATIVE STREAMING, ENABLING ADAPTIVE STREAMING TO SILVERLIGHT, OTHER CLIENTS OVER HTTP, APPLE HTTP, TCP/UDP, PROCESSOR, MEMORY FLASH, MEMORY RAM, TBD, HARD DRIVE, SUBSYSTEM, EPC, IMS, QOS, ASTERISK BASED PBX, YMAX, CLEC, CMOS RF, VLSI, PLATFORMS, TELCO, SDK, SOFTWARE PLATFORM, ENCODERSCMS, ISPS, APPS, DEVELOPERS, SIM INTERFACE, or the like.

When the terms "backers" and "creators" in the IPTV system are used, reference is to different users of the system; however, other terms maybe be used.

It should be understood that when the disclosure states that it is possible to click on, or navigate using a button or other graphic user interface element. It is also possible to select the element with other known means, including using voice commands or hand gestures, which can be interpreted by built in hardware in the IPTV devices. It is also possible to initiate the action by multi-touch finger swipes or finger combination drags or taps, interpreted using built in hardware in the IPTV devices, including tablets or smartphones. Further, it is also possible for the backer to select a campaign using a one-touch or two-touch electronic device.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein. These and other systems, methods, objects, features, and advantages of the present disclosure will be apparent to those skilled in the art from the following detailed description of the embodiments and drawings.

All documents mentioned herein are hereby incorporated in their entirety by reference. References to items in the singular should be understood to include items in the floral, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

With respect to the above, it is to be understood that the invention is not limited in its application to the details of construction and to the arrangement of the components listed or the steps set forth in the description or illustrated in the drawings. The various apparatus and methods of the disclosed invention are capable of other embodiments, and of being practiced and carried out in various ways that would be readily known to those skilled in the art, given the present disclosure. Further, the terms and phrases used herein are for descriptive purposes and should not be construed as in any way limiting.

As such, those skilled in the art will appreciate that the conception upon which this disclosure is based by be utilized as a basis for designing other inventions with similar properties. It is important therefore that the embodiments, objects, and claims herein, be regarded as including such equivalent construction and methodology insofar as they do not depart from the spirit and scope of the present invention.

It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

What is claimed:

1. A method of online crowdfunding, wherein said method comprises the steps of:
    accessing, by a computer system comprising a plurality of computer processors with one or more network interfaces, a virtual 3D space comprising, at least one live streaming video, and a 3D model, wherein a first user computer set is assigned to at least one campaign creator and a second user computer set is assigned to at least one campaign backer, wherein the campaign creator is accessing the computer system using campaign creator's live streaming computing device including a display and a camera, wherein the campaign backer is accessing the computer system using campaign backer's computing device including a display;
    displaying a live streaming video in a virtual 3D space, sent from the campaign creator's live streaming computing device, on the campaign backer's computing device's display, wherein the campaign backer's computing device comprises a mixed reality headset capable of displaying a virtual 3D space including a virtual screen;
    displaying an online crowdfunding campaign in virtual 3D space on the campaign backer's computing device's display, wherein a combination of a live streaming video shown on a virtual screen and a 3D model is displayed;
    inputting a funding command, by the campaign backer while the live streaming video is playing, wherein one or more funding actions and data inputs can be performed by the campaign backer's computing device including a display without fully blocking or pausing the live streaming video;
    purchasing, by the campaign backer, a product or service on the campaign backer's computing device including a display using a 3D user interface;
    receiving payment information data from the campaign backer, which includes at least one of a bank account number, credit card number, or other payment information data from a third party;
    assigning the campaign backer a rewards credit for the purchased product or service as part of a membership rewards program;
    allowing the campaign backer to fund the online crowdfunding campaign using the 3D user interface on the campaign backer's mixed reality headset display;
    sending, by the computer system, a funding command for the displayed online crowdfunding campaign over a network to initiate funding of the online crowdfunding campaign, using the campaign backer's rewards credit data;
    sending, by the computer system, a payment of the rewards credit acknowledgment data to the campaign creator's live streaming computing device, indicating the payment using the campaign backer's rewards credit was successful.

2. The method of claim 1, wherein the inputting a funding command is done using a button on a hand controller, voice commands or hand gestures.

3. The method of claim 1, wherein the method further comprising the step of: displaying a current funding amount, funding goal, and an identifier of the campaign creator on the campaign backer's computing device's display.

4. The method of claim 1, wherein the campaign backer's mixed reality headset is an AR or VR head mounted display.

5. The method of claim 1, wherein said campaign backer's computing device accepts a funding command using voice commands, input using one of a smart home speaker or other smart home device with a microphone that is connected to the computer system over a network.

6. The method of claim 1, wherein said campaign creator's computing device is selected from the group consisting of personal computers, smart phones, digital tablets, smart watches, and cameras.

7. The method of claim 1, wherein said campaign backer's computing device comprises motion controllers allowing for the backer to back campaigns using the buttons on the hand controllers.

8. The method of claim 1, wherein the campaign backer's computing device comprises a wireless module capable of sending and receiving data using at least one of a LTE network, and a 5G network.

9. The method of claim 1, wherein the campaign backer can fund the online crowdfunding campaign using one or two clicks on an input device including a motion controller.

10. The method of claim 1, wherein the campaign backer can select AR or VR apps using a graphic users interface.

11. A mixed reality online crowdfunding apparatus, wherein the apparatus comprises:
    a computer system comprising a plurality of computer processors with one or more network interfaces, a virtual 3D space comprising, at least one live streaming video, and a 3D model, wherein a first user computer set is assigned to at least one campaign creator and a second user computer set is assigned to at least one campaign backer, wherein the campaign creator is accessing the computer system using campaign creator's live streaming computing device including a display and a camera, wherein the campaign backer is accessing the computer system using campaign backer's computing device including a display, wherein the campaign backer's computing device including a display displays a live streaming video in a virtual 3D space, sent from the campaign creator's live streaming computing device, wherein the campaign backer's computing device comprises a mixed reality headset capable of displaying a virtual 3D space including a virtual screen, wherein the campaign backer's computing device including a display displays an online crowdfunding campaign in virtual 3D space, wherein a combination of a live streaming video shown on a virtual screen and a 3D model is displayed, wherein the campaign backer's computing device including a display receives an input of a funding command, by the campaign backer while the live streaming video is playing, wherein one or more funding actions and data inputs can be performed by the campaign backer's computing device including a display without fully blocking or pausing the live streaming video, wherein the campaign backer's computing device including a display receives a purchase command by the campaign backer for a product or service using a 3D user interface;

wherein the campaign backer's computing device including a display receives payment information data from the campaign backer, which includes at least one of a bank account number, credit card number, or other payment information data from a third party;

wherein the campaign backer's computing device including a display receives assigning the campaign backer a rewards credit for the purchased product or service as part of a membership rewards program;

wherein, the computer system, allows the campaign backer to fund the online crowdfunding campaign using the 3D user interface on the campaign backer's mixed reality headset display, wherein the campaign backer's computing device including a display receives a funding command for the displayed online crowdfunding campaign over a network to initiate funding of the online crowdfunding campaign, using the campaign backer's rewards credit data;

wherein, the computer system sends a payment of the rewards credit acknowledgment data to the campaign creator's live streaming computing device, indicating the payment using the campaign backer's rewards credit was successful.

12. The apparatus of claim 11, wherein the inputting a funding command is done using a button on a hand controller, voice commands or hand gestures.

13. The apparatus of claim 11, wherein the crowdfunding campaign further comprising a current funding amount, a funding goal, and an identifier of the campaign creator on the campaign backer's computing device's display.

14. The apparatus of claim 11, wherein the campaign backer's mixed reality headset is an AR or VR head mounted display.

15. The apparatus of claim 11, wherein said campaign backer's computing device accepts a funding command using voice commands, input using one of a smart home speaker or other smart home device with a microphone that is connected to the computer system over a network.

16. The apparatus of claim 11, wherein said campaign creator's computing device is selected from the group consisting of personal computers, smart phones, digital tablets, smart watches, and cameras.

17. The apparatus of claim 11, wherein said campaign backer's computing device comprises a motion controller allowing for the backer to back campaigns using a button on a hand controller.

18. The apparatus of claim 11, wherein the campaign backer's computing device comprises a wireless module capable of sending and receiving data using at least one of a LTE network, and a 5G network.

19. The apparatus of claim 11, wherein the campaign backer can fund the online crowdfunding campaign using one or two clicks on an input device including a motion controller.

20. The apparatus of claim 11, wherein the campaign backer can select AR or VR apps using a graphic users interface.

* * * * *